(12) United States Patent
Hou et al.

(10) Patent No.: US 10,876,844 B2
(45) Date of Patent: Dec. 29, 2020

(54) SYSTEMS AND METHODS FOR LOADING AND TRACKING MAPS ON A VEHICLE

(71) Applicant: DiDi Research America, LLC, Mountain View, CA (US)

(72) Inventors: Tingbo Hou, Santa Clara, CA (US); Guomin Xiang, San Jose, CA (US)

(73) Assignee: Beijing Voyager Technology Co., Ltd., Beijing (CN)

(*) Notice: Subject to any disclaimer, the term of this patent is extended or adjusted under 35 U.S.C. 154(b) by 0 days.

(21) Appl. No.: 16/232,693

(22) Filed: Dec. 26, 2018

(65) Prior Publication Data

US 2020/0208995 A1 Jul. 2, 2020

(51) Int. Cl.
*G01C 21/32* (2006.01)
*G01S 19/43* (2010.01)
*G01C 21/34* (2006.01)
*G06T 1/60* (2006.01)

(52) U.S. Cl.
CPC .............. *G01C 21/32* (2013.01); *G01C 21/34* (2013.01); *G01S 19/43* (2013.01); *G06T 1/60* (2013.01)

(58) Field of Classification Search
CPC ......... G01C 21/32; G01C 21/34; G01S 19/43; G06T 1/60
See application file for complete search history.

(56) References Cited

U.S. PATENT DOCUMENTS

| | | | |
|---|---|---|---|
| 6,885,939 | B2 | 4/2005 | Schmidt et al. |
| 8,095,307 | B2 | 1/2012 | Eberta et al. |
| 2003/0078724 | A1 | 4/2003 | Kamikawa et al. |

(Continued)

FOREIGN PATENT DOCUMENTS

| | | |
|---|---|---|
| CN | 105571608 | 5/2016 |
| CN | 105893565 | 8/2016 |
| WO | WO 2009/027161 | 3/2009 |

OTHER PUBLICATIONS

International Search Report and Written Opinion in International Application No. PCT/US2018/067556, Notification dated Apr. 26, 2019.

(Continued)

*Primary Examiner* — Hunter B Lonsberry
*Assistant Examiner* — Elizabeth Yang
(74) *Attorney, Agent, or Firm* — Knobbe Martens Olson & Bear LLP

(57) ABSTRACT

A method and systems for loading and tracking maps on a moving vehicle. One method includes obtaining a geographic location of a system on a vehicle, obtaining a boundary corresponding to a contiguous geographical boundary area around the geographic location of the system, loading map data comprising a plurality of map data tiles each including a portion of the geographical boundary area, the plurality of map data tiles including a center tile having a point corresponding to the system location and surrounding map data tiles. The method further includes obtaining an updated system location, and if the updated geographic location is outside of the boundary area, obtaining an updated boundary centered on the updated geographic location and loading map data based on the updated boundary such that the resulting loaded map data includes a center tile and map data tiles surrounding the center tile that intersect the geographical boundary area.

32 Claims, 12 Drawing Sheets

(56) References Cited

U.S. PATENT DOCUMENTS

| | | | |
|---|---|---|---|
| 2010/0017119 A1 | 1/2010 | Diaz et al. | |
| 2010/0091017 A1* | 4/2010 | Kmiecik | G01C 11/02 |
| | | | 345/420 |
| 2014/0058661 A1* | 2/2014 | Choi | G01C 21/32 |
| | | | 701/428 |
| 2014/0125655 A1* | 5/2014 | Kunath | G06T 15/005 |
| | | | 345/419 |
| 2016/0371808 A1* | 12/2016 | Croxford | G09G 5/14 |
| 2018/0189323 A1* | 7/2018 | Wheeler | G06F 12/0811 |
| 2019/0251717 A1* | 8/2019 | Liu | G06F 16/51 |
| 2020/0209005 A1 | 7/2020 | Hou et al. | |

OTHER PUBLICATIONS

International Search Report and Written Opinion in International Application No. PCT/US2018/067555, Notification dated May 10, 2019.

\* cited by examiner

SYSTEMS AND METHODS FOR LOADING AND TRACKING MAPS ON A VEHICLE

BACKGROUND

Field

This disclosure generally relates to handling map data in vehicles, and, in particular, to dynamically loading map data into memory of a computer system on a vehicle for controlling the vehicle.

Background

Current solutions for autonomous driving, providing driver-assist features, and/or ride-sharing services heavily rely on data rich maps, which may be referred to as high definition (HD) maps. These HD maps may have extremely high precision and include geographic and object data at the centimeter-size level to provide a vehicle and/or driver information that can be used to (along with real-time sensor data) generate precise control instructions on how to maneuver around the real-world space. The size of an HD map can be extremely large due to its high resolution and detailed information. Continuously loading numerous HD maps for use by a vehicle may occur when driving over a distance where many HD maps are needed to accurately provide map information over a route. Due to the concerns of bandwidth and security with continuously transmitting large amounts of data over current wireless networks (e.g., 4G networks) to a moving system, it would be advantageous to have a secure system that can provide large HD maps without relying on transmission capabilities of wireless networks to receive the HD maps at the time they are immediately needed by the vehicle.

SUMMARY

The systems, methods, and devices of the invention each have several aspects (features), no single aspect of which is solely responsible for its desirable attributes. Without limiting the scope of this invention as expressed by the claims which follow, some of the aspects are described below.

One innovation includes a method of loading information (e.g., HD map data) for a vehicle which may be implemented on a device of a moving vehicle, the device having at least one processor and a storage component coupled to the processor. In one example, the method includes obtaining, by the at least one processor, a geographic location of the device, obtaining a boundary corresponding to a contiguous geographical boundary area around the geographic location of the device, loading map data comprising a plurality of map data tiles from the storage component to a memory of the device, each of the plurality of map data tiles including a portion of the geographical boundary area, the geographical boundary area corresponding to a portion of the loaded map data, wherein the plurality of map data tiles includes a center tile having a point corresponding to the geographic location of the device and surrounding map data tiles, and wherein the boundary is centered on the center tile and dimensioned such that the geographical boundary area intersects the surrounding map data tiles. The method may further includes, while the vehicle is in motion, obtaining, by the at least one processor, an updated geographic location of the device, determining the position of the updated geographic location relative to the boundary area, and in response to determining the updated geographic location is outside of the boundary area, obtaining an updated boundary corresponding to an updated geographic area centered on the updated geographic location and loading map data from the storage component to the memory of the device, such that the resulting loaded map data includes a center tile having a point corresponding to the updated geographic location of the device, and map data tiles surrounding the center tile that intersect the geographical boundary area.

The methods described herein may have one or more other aspects (features) in various embodiments of the method, a number of these aspects being noted here. However, various embodiments of such methods may have additional aspects or fewer aspects, and the aspects disclosed herein can be used together in an number of embodiments even if specifically not illustrated or described as being in a certain embodiment, as one of ordinary skill in the art will appreciate. For example, in one aspect the surrounding map data tiles are adjacent to the center tile. In another aspect the map data tiles comprise elevation information. In another aspect the map data tiles comprise intensity information. In another aspect the geographical boundary area corresponds to an area that includes the center tile and at least a portion of the map data tiles adjacent to the center tile. In another aspect the boundary is rectangular-shaped. In another aspect, each map data tile comprises a width dimension and a length dimension, and the boundary comprises a width dimension and a length dimension, the boundary width dimension is between one and three times the width dimension of each map data tile, and the boundary length dimension is between one and three times the length dimension of each map data tile.

In another aspect of a method, the loaded map data includes nine map data tiles. In another aspect, each of the nine map data tiles has equal dimensions. In another aspect, the nine map data tiles include a center map data tile and eight surrounding map data tiles. In another aspect, the map data tiles include a center map data tile and more than eight surrounding map data tiles. In another aspect, the vehicle is an autonomous vehicle. In another aspect, the boundary may be non-rectangular. For example, the boundary may be more expansive (i.e., encompassing more area) in an area that represents the direction the vehicle is moving in, will be moving in next, or is expected to move in. In another aspect, the size of the boundary and the updated boundary are pre-determined. In another aspect, obtaining the updated boundary comprises dynamically determining the updated boundary. In another aspect, dynamically determining the updated boundary comprises obtaining a velocity of the moving vehicle and determining a dimension of the boundary based on the velocity. In another aspect, dynamically determining the updated boundary comprises obtaining a velocity of the moving vehicle and determining a shape of the boundary based on the velocity. Some of the methods may further include determining a motion direction representing the direction the vehicle is moving, wherein the boundary extends farther from the updated geographical location of the device in the direction of the motion direction than the boundary extends in other directions. Various storage devices suitable for storing and transferring large HD maps may be used, and in some embodiments the storage device may include an optical drive or a magnetic hard drive. Other types of hard drives may also be used. In some embodiments, the storage device may include non-moving storage devices (e.g., RAM or DRAM).

In another aspect of a method each map data tile is representative of an area that has a width dimension of less than 1000 meters and/or a length dimension of less than 1000 meters. In another aspect, each map data tile is representative of an area that has a width dimension of less than 500 meters and/or a length dimension of less than 500 meters. Other dimensions for the map data tiles are also contemplated, including that each map data tile is representative of an area that has a width dimension of less than 250 meters and/or a length dimension of less than 250 meters, each map data tile is representative of an area that has a width dimension of about 200 meters and/or a length dimension of about 200 meters, or each map data tile is representative of an area that has a width dimension of less than 100 meters and a length dimension of less than 100 meters.

In another aspect, the boundary is dimensioned such that in response to determining the updated geographic location is outside of the boundary area, loading map data based on the updated geographic location comprises loading three map data tiles. In another aspect, the boundary is dimensioned such that in response to determining the updated geographic location is outside of the boundary area, loading map data based on the updated geographic location comprises loading five map data tiles. In another aspect, obtaining a geographic location of the device comprises receiving, by the at least one processor, information from a global positioning system (GPS). In another aspect, obtaining a geographic location of the device comprises receiving geographic location information from at least one transmitter at a fixed location. In another aspect, obtaining a geographical location of the device comprises sensing at least one fixed location indicator using a sensing system on the vehicle, and determining a geographical location based on the sensed at least one fixed location indicator.

Another innovation includes a system, comprising a storage system configured to store map data comprising a plurality of map data tiles, at least one processor coupled to a memory component including a set of instructions and coupled to the storage system, when executing the set of instructions, the at least one processor is configured to cause the system to obtain a location of the device, obtain a boundary corresponding to a contiguous geographical boundary area around the geographic location of the device, load map data from the storage component to the memory of the device, the map data comprising a plurality of map data tiles, each of the plurality of map data tiles including a portion of the geographical boundary area and the geographical boundary area corresponding to a portion of the loaded map data, where the plurality of map data tiles includes a center tile having a point corresponding to the geographic location of the device and surrounding map data tiles, and where the boundary is centered on the center tile and dimensioned such that the geographical boundary area intersects the surrounding map data tiles. The system is further configured to obtain an updated geographic location of the device (e.g., when the device is in motion on a vehicle), determine the position of the updated geographic location relative to the boundary area, and in response to determining the updated geographic location is outside of the boundary area, obtain an updated boundary centered on the updated geographic location and load map data from the storage component to the memory of the device based on the updated boundary. The system can further include the vehicle.

Aspects disclosed above relating to the method can also be implemented on the system. For example, the memory component can include instructions to configure the at least one processor perform the actions related to loading map data described above for the method.

Another innovation includes a non-transitory computer readable medium storing instructions, the instructions, when executed by a computing device, causing the computing device to obtain a geographic location of the device, obtain a boundary corresponding to a contiguous geographical boundary area around the geographic location of the device, load map data from the storage component to the memory of the device, the map data comprising a plurality of map data tiles, each of the plurality of map data tiles including a portion of the geographical boundary area and the geographical boundary area corresponding to a portion of the loaded map data, wherein the plurality of map data tiles includes a center tile having a point corresponding to the geographic location of the device and surrounding map data tiles, and wherein the boundary is centered on the center tile and dimensioned such that the geographical boundary area intersects the surrounding map data tiles, and while the vehicle is in motion: obtain an updated geographic location of the device, determine the position of the updated geographic location relative to the boundary area, and in response to determining the updated geographic location is outside of the boundary area, obtain an updated boundary centered on the updated geographic location and load map data from the storage component to the memory of the device based on the updated boundary.

Another innovation includes a method that may be implemented on a device (or system) on a vehicle, the method for loading data from a storage system capable of storing a large amount of data to a memory component (e.g., working memory or other quickly accessible memory) in communication with at least one processor. The device includes the at least one processor, the memory component and a data storage component coupled to the processor. In one embodiment, the method includes obtaining, by the at least one processor, a location of the vehicle, determining, by the at least one processor, data retrieval information based on the vehicle location, the data retrieval information identifying a proximal portion of stored object geometry data that is within a certain distance of the vehicle, retrieving, by the at least one processor, the proximal portion of the object geometry data from the data storage component, and storing, by the at least one processor, the proximal portion of the object geometry data in the memory component.

Embodiments of systems described herein may have one or more other aspects (features) in various embodiments of the system, a number of these aspects being noted here. However, various embodiments of such systems may have additional aspects or fewer aspects, and the aspects disclosed herein can be used together in an number of embodiments even if specifically not illustrated or described as being in a certain embodiment, as one of ordinary skill in the art will appreciate. In one aspect, the data storage component is configured to store the object geometry data in a data structure such that a portion of the stored object geometry data representing an area around the vehicle may be retrieved. In another aspect, the vehicle is an autonomous vehicle. In another aspect, the proximal portion of the object geometry data at least partially surrounds the vehicle. In another aspect the method further comprises obtaining, by the at least one processor, the speed and direction of the vehicle, and wherein determining the data retrieval information comprises determining the based at least in part on the speed and direction of the vehicle. In another aspect, the method further comprises determining a route of one or more roads for the vehicle to travel along from a location of the vehicle to a destination, obtaining road identification information indicative of a road the vehicle is on while the vehicle is traveling along the route, and determining the data retrieval information based on the vehicle location and the road identification information. In another aspect, the road identification information includes information on one or more roads that are along the route and that the vehicle is approaching.

In another aspect of the method, the method further comprises determining the distance the vehicle has traveled along the route, and wherein determining data retrieval information is based in part on the distance the vehicle has traveled along the route.

Another innovation includes a system implemented on a vehicle, for example in an autonomous vehicle. In an embodiment, the system includes a data storage component configured to store object geometry data in a data structure such that a portion of the stored object geometry data may be retrieved. The data storage component may be, for example, a magnetic or optical hard drive, or may include a one or more chips, that can store large amounts of data (e.g., gigabytes, terabytes, petabytes, or exabytes, or more) and allow retrieval of the stored information. The system also includes at least one processor having a memory component, wherein the at least one processor is configured to obtain a location of the vehicle, determine data retrieval information based on the vehicle location, the data retrieval information identifying a proximal portion of the object geometry data that is within a certain distance of the vehicle, and retrieve the proximal portion of the object geometry data from the data storage component and store it in the memory component.

Embodiments of systems described herein may have one or more other aspects (features) in various embodiments of the system, a number of these aspects being noted here. However, various embodiments of such systems may have additional aspects or fewer aspects, and the aspects disclosed herein can be used together in an number of embodiments even if specifically not illustrated or described as being in a certain embodiment, as one of ordinary skill in the art will appreciate. For example, in one aspect the proximal portion of the object geometry data at least partially surrounds the vehicle location. In another aspect, the proximal portion of the object geometry data is centered on the vehicle location. In another aspect, the proximal portion of the object geometry data extends farther in distance from the front of the vehicle at the vehicle location than from the back of the vehicle. In another aspect, the proximal portion of the object geometry data surrounds the vehicle location.

In various embodiments, a system may also include a global positioning system (GPS), and wherein the at least one processor is further configured to obtain the location of the vehicle from the GPS. In one aspect, the at least one processor is further configured to obtain the speed and direction of the vehicle, and determine the data retrieval information based at least in part on the speed and direction of the vehicle. In another aspect, the at least one processor is further configured to obtain road identification information indicative of a road the vehicle is on, and determine data retrieval information based on the vehicle location and the road identification information. In another aspect, the system further may include a navigation system configured to receive an input identifying a destination, determine a route of one or more roads for the vehicle to travel along from a location of the vehicle to the destination, determine the road identification information while the vehicle is traveling along the route, and communicate the road identification information to the at least one processor. In another aspect, the at least one processor is further configured to obtain a speed of the vehicle, and wherein the at least one processor is further configured to determine the data retrieval information based in part on the speed of the vehicle. In another aspect, the system further includes an odometer device configured to determine the distance the vehicle has traveled along the route, wherein the data retrieval information is based in part on the distance the vehicle has traveled along the route. In another aspect, the road identification information includes information on roads that are along the route that the vehicle is approaching.

BRIEF DESCRIPTION OF THE DRAWINGS

The features and advantages of the devices described herein will become more fully apparent from the following description and appended claims, taken in conjunction with the accompanying drawings. These drawings depict only several embodiments in accordance with the disclosure and are not to be considered limiting of its scope. In the drawings, similar reference numbers or symbols typically identify similar components, unless context dictates otherwise. In some instances, the drawings may not be drawn to scale.

DETAILED DESCRIPTION OF CERTAIN INVENTIVE ASPECTS

Figure 1A:
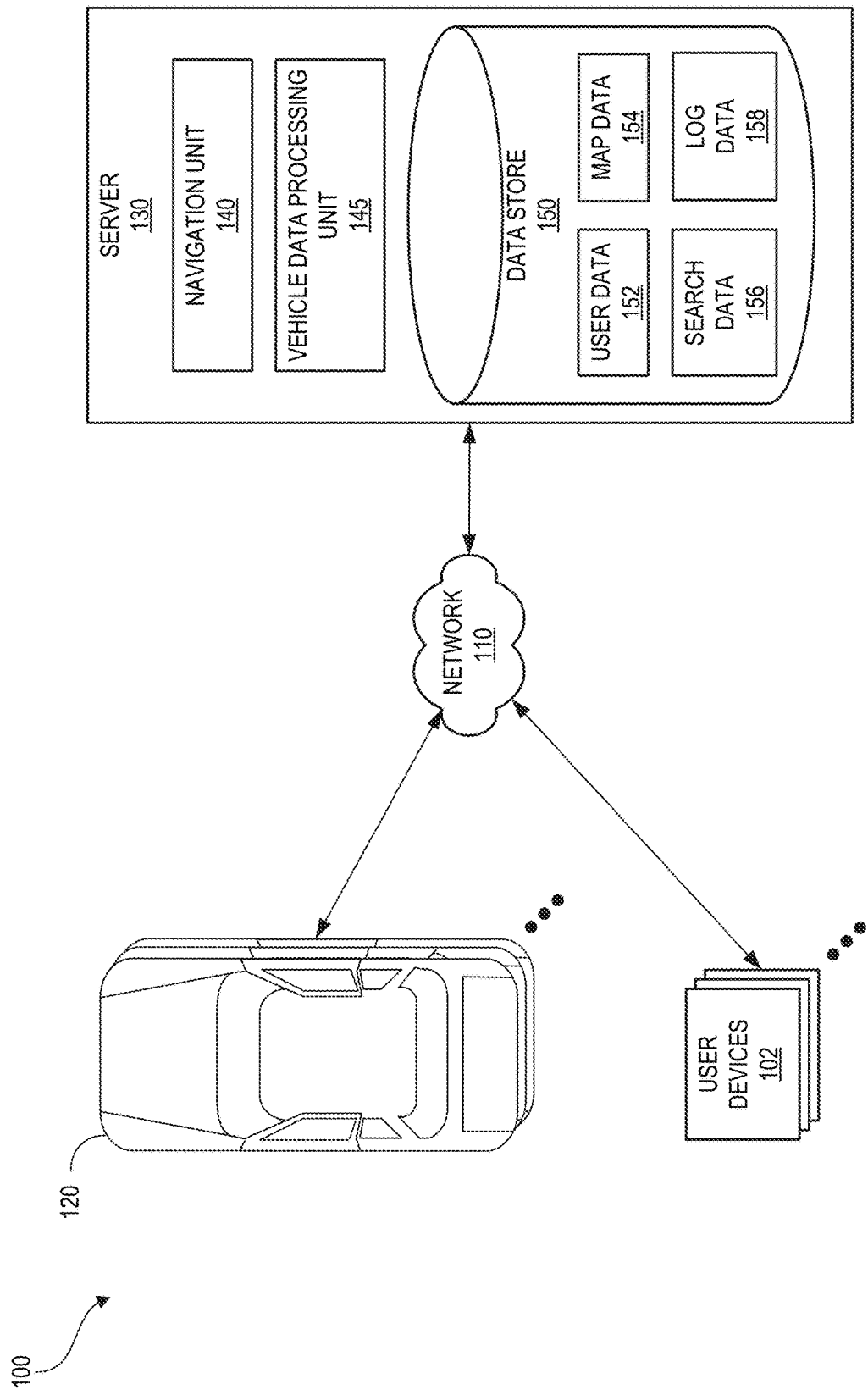
FIG. 1A illustrates a block diagram of a networked vehicle environment in which one or more vehicles and/or one or more user devices interact with a server via a network, according to one embodiment.

The following detailed description is directed to certain aspects and examples of the invention. However, the invention can be embodied in a multitude of different ways. It should be apparent that the aspects herein may be embodied in a wide variety of forms and that any specific structure, function, or both being disclosed herein is merely representative of one or more embodiments of the invention. An aspect disclosed herein may be implemented independently of any other aspects and that two or more of these aspects may be combined in various ways. For example, different embodiments of methods of loading map data from a map data storage system configured to store large quantities of data (e.g., terabytes or more) into a "working" memory of a computer system on a vehicle as it is moving along a route may be implemented using a number of the aspects/features disclosed herein. In addition, such a method may be implemented or such a system may be practiced using other processes, steps, structure, functionality, or structure in addition to, or other than one or more of the aspects set forth herein.

Map data used by a vehicle (e.g., an autonomous vehicle, a vehicle that provider driver-assist features, a vehicle used for location-based services, etc.) may be referred to as an HD maps may contain many type of information, ranging from raw data (e.g., images captured at a certain location and at a certain orientation with respect the location) to representations of features or objects (e.g., information representing roads, signs, man-made objects near a road, natural objects near a road, etc.). Such data and features may represent information that was previously collected by another vehicle traveling along a road, or determined to be near a road (e.g., elevation data). Generally, as used herein, "near a road" or "proximal to a road" or "proximal portion" or the like refers to information that may be sensed by one or more sensors of a sensor system disposed on a vehicle, or information that a vehicle may use for positioning the vehicle or controlling the vehicle.

Various embodiments of HD maps may include different information, that may be provided by various data information systems on one or more storage components. For example, information in an HD map, or a portion of an HD map (e.g., a map data tile), may include information that represents one or more of elevation, intensity, natural features (geographic features), roads, signs, buildings houses, walkways, landscape, and other man-made objects or objects placed in a location by man. In some embodiments, HD maps include elevation information intensity information. In some embodiments, information representing objects, for example man-made objects, are stored in a separate data storage arrangement from elevation and/or intensity information. For example, in a database which can be queried as needed for the objects around a vehicle as a vehicle moves along a route. Such queries may be based on a predetermined distance around a vehicle, that is, such that all the objects within a certain distance are returned based on such the query. In another example, such queries may be based on a distance around the vehicle that changes based on one or more factors, for example, the vehicle's speed, location (e.g., city or country road), or direction of travel.

To be effective for use by a vehicle, HD maps may include information at a centimeter-scale resolution. In an illustrative embodiment, in example of raw data structured on a 10 cm×10 cm grid, the resolution may be determined by the upper bound of errors a vehicle can tolerate. For each cell on the grid, three bytes may be used: one for intensity information, and two bytes for elevation information. Therefore, for one square meter, 300 bytes in memory (10*10*3) are used. For an area of 10 km by 10 km, storage of the data may require 30 GB of memory (e.g., 10 k*10 k*300). If the stored data is compressed, less memory may be required. However, any decompression of data is being retrieved from a data storage component requires at least some additional overhead associated with the decompression processes, and thus may increase overhead for retrieving the data. Storage of the HD map data is one issue. Communicating the HD map data from a storage location to the vehicle is another issue. Such communication must be reliable, efficient, and secure to ensure the required HD map data is available when needed.

As a vehicle moves from point a first point to a second point, a navigation system may provide the route the vehicle should use, for example, indicating the particular highways and streets for the vehicle to use. For second-to-second control of the vehicle, only the data around the vehicle may need to be loaded. When the vehicle is moving, we can load new data into memory, and remove old data from it. In one embodiment to implement a method of loading new HD maps into memory and removing old HD maps from memory, a grid of information that the vehicle is moving through can be portrayed as tiles of information. For example, each tile may have a data resolution of 2000 by 2000, which corresponds to 200 m by 200 m in real world.

One example of choosing the dimensions for map data tiles may be based on tile loading frequency and tile size. We don't want to load tiles too frequently. The I/O for reading files from disk is expensive. This indicates that tiles cannot be too small. In urban areas, a vehicle may move with speed from 10 m/s to 20 m/s. Therefore, it takes 10 to 20 seconds for a vehicle to pass through one tile. This results in a frequency of 0.05 to 0.1 Hz, which is affordable. The size of the tile should not be too large because that will take more memory. Although computers on a vehicle may be usually very powerful, the computing resources may actually be very limited because of all the computing needs that take place on the vehicle. In an example where the memory consumption of HD maps is desired to be about 100 MB or less, a tile takes 2 k*2 k*3 B=12 MB memory. So nine tiles will take 108 MB memory. We want the full tile loading to be finished in 100 ms, faster if possible. Tile dimensions should be compatible with loading time at different scenarios. Larger tile size results in longer loading time, which can result in a tile not being available before it is needed to be accessed. On the contrary, smaller tile size results in higher loading frequency, where a similar availability issue may happen as the vehicle quickly moves across one tile of information and needs the next tiles. Tiles may be compressed files. For a tile size of 2000 by 2000, it takes about 10 ms to fully load a tile, including reading and decompressing. So, loading a full nine-tile pack may takes less 100 ms, which can be done by one thread before the vehicle goes to unloaded area. To account for the above-described issues, in one embodiment, 2000 by 2000 is a tile size that satisfies resource constrictions and optimizes loading frequency.

Certain embodiments described herein include using HD map data that is configured in arrangement of tiles. As needed, one or more tiles a loaded from a storage component into the memory of a device controlling the time is vehicle. For example, at any time, there are nine tiles loaded in memory representing a certain bounded area around the vehicle. To seamlessly serve the HD map data, tiles that the vehicle may goes to may be pre-loaded in a background thread. The tile loading is completely hidden for clients. For example, a boundary defining an area (or region) with a size of 4000 by 4000 may be placed around a center tile. When the vehicle moves within the bounded area, there is no change to tile loading. When the vehicle moves out of the bounded area, new tiles will be loaded to make a new nine-tile arrangement around the center tile.

A method for loading map data may be implemented on a computing device of a vehicle. The method can include for example obtaining the geographic position of the vehicle, using for example GPS, and inertia navigation system, position indicators fixed along a road that are sensed by one or more sensors of the vehicle, and/or receiving transmissions (e.g., radio or optical) from transmitters positioned in locations with the vehicles can receive their signals. A boundary corresponding to a geographical boundary area around the position of the vehicle may be obtained (e.g., calculated). Then, the method may load map data that includes a plurality of map data tiles from a storage component to a memory of the device. Each of the plurality of map data tiles include a portion of the due geographical boundary area around the vehicle, the geographical boundary area corresponding to a portion of the loaded map data. That is, the total loaded map data covers the geographical boundary area and extends beyond the geographical boundary area, based on the tile size. The plurality of map data tiles may include a center tile having a point corresponding to the geographic location of the device. The plurality of map tiles may also include surrounding mandated tiles that are arranged around the center tile (and around the location of the vehicle). The boundary is centered on the center tile and dimension such the geographical boundary area intersects the surrounding map data tiles. For example, the loaded map data may include nine tiles arranged in a rectangle, the vehicle's location corresponding to a point in the center tile.

While the vehicle is in motion an updated geographic location of the device is obtained (e.g., using GPS, roadside location indicia, an inertia location system, etc.) and the systems determines the position of the vehicle at the updated geographical location relative to the boundary area. In response to determining the updated location of the vehicle is outside of the boundary area, an updated boundary is determined. The updated boundary corresponds to an updated area centered on the updated location of the vehicle. Map data in the form of map data tiles may be loaded from the storage component to the memory of the device such that the resulting loaded map data includes a center tile having a point corresponding to the updated location of device (vehicle), and map data tiles surrounding the center tile that intersect the boundary area. In other words, when the vehicle's location is determined to have exceeded the boundary area as defined by the most recent determined boundary, additional map data tiles are loaded.

ILLUSTRATIVE EMBODIMENT

Embodiments of system and methods for loading map data are described below in reference to the figures. It will be appreciated by those of ordinary skill in the art that various modifications and changes may be made without departing from the scope of the described technology. Such modifications and changes are intended to fall within the scope of the embodiments. It will also be appreciated by those of ordinary skill in the art that parts included in one embodiment are interchangeable with other embodiments—one or more parts from a depicted embodiment can be included with other depicted embodiments in any combination. For example, any of the various components described herein and/or depicted in the figures may be combined, interchanged or excluded from other embodiments.

FIG. 1A illustrates a block diagram of a networked vehicle environment 100 in which one or more vehicles 120 and/or one or more user devices 102 interact with a server 130 via a network 110, according to one embodiment. For example, the vehicles 120 may be equipped to provide ride-sharing and/or other location-based services, to assist drivers in controlling vehicle operation (e.g., via various driver-assist features, such as adaptive and/or regular cruise control, adaptive headlight control, anti-lock braking, automatic parking, night vision, blind spot monitor, collision avoidance, crosswind stabilization, driver drowsiness detection, driver monitoring system, emergency driver assistant, intersection assistant, hill descent control, intelligent speed adaptation, lane centering, lane departure warning, forward, rear, and/or side parking sensors, pedestrian detection, rain sensor, surround view system, tire pressure monitor, traffic sign recognition, turning assistant, wrong-way driving warning, traffic condition alerts, etc.), and/or to fully control vehicle operation. Thus, the vehicles 120 can be regular gasoline, natural gas, biofuel, electric, hydrogen, etc. vehicles configured to offer ride-sharing and/or other location-based services, vehicles that provide driver-assist functionality (e.g., one or more of the driver-assist features described herein), and/or automated or autonomous vehicles (AVs). The vehicles 120 can be automobiles, trucks, vans, buses, motorcycles, scooters, bicycles, and/or any other motorized vehicle.

The server 130 can communicate with the vehicles 120 to obtain vehicle data, such as route data, sensor data, perception data, vehicle 120 control data, vehicle 120 component fault and/or failure data, etc. The server 130 can process and store the vehicle data for use in other operations performed by the server 130 and/or another computing system (not shown). Such operations can include running diagnostic models to identify vehicle 120 operational issues (e.g., the cause of vehicle 120 navigational errors, unusual sensor readings, an object not being identified, vehicle 120 component failure, etc.); running models to simulate vehicle 120 performance given a set of variables; identifying objects that cannot be identified by a vehicle 120, generating control instructions that, when executed by a vehicle 120, cause the vehicle 120 to drive and/or maneuver in a certain manner along a specified path; and/or the like.

The server 130 can also transmit data to the vehicles 120. For example, the server 130 can transmit map data, firmware and/or software updates, vehicle 120 control instructions, an identification of an object that could not otherwise be identified by a vehicle 120, passenger pickup information, traffic data, and/or the like.

In addition to communicating with one or more vehicles 120, the server 130 can communicate with one or more user devices 102. In particular, the server 130 can provide a network service to enable a user to request, via an application running on a user device 102, location-based services (e.g., transportation services, such as ride-sharing services). For example, the user devices 102 can correspond to a computing device, such as a smart phone, tablet, laptop, smart watch, or any other device that can communicate over the network 110 with the server 130. In the embodiment, a user device 102 executes an application, such as a mobile application, that the user operating the user device 102 can use to interact with the server 130. For example, the user device 102 can communicate with the server 130 to provide location data and/or queries to the server 130, to receive map-related data and/or directions from the server 130, and/or the like.

The server 130 can process requests and/or other data received from user devices 102 to identify service providers (e.g., vehicle 120 drivers) to provide the requested services for the users. In addition, the server 130 can receive data—such as user trip pickup or destination data, user location query data, etc.—based on which the server 130 identifies a region, an address, and/or other location associated with the various users. The server 130 can then use the identified location to provide services providers and/or users with directions to a determined pickup location.

The application running on the user device 102 may be created and/or made available by the same entity responsible for the server 130. Alternatively, the application running on the user device 102 can be a third-party application that includes features (e.g., an application programming interface or software development kit) that enables communications with the server 130.

A single server 130 is illustrated in FIG. 1A for simplicity and ease of explanation. It is appreciated, however, that the server 130 may be a single computing device, or may include multiple distinct computing devices logically or physically grouped together to collectively operate as a server system. The components of the server 130 can be implemented in application-specific hardware (e.g., a server computing device with one or more ASICs) such that no software is necessary, or as a combination of hardware and software. In addition, the modules and components of the server 130 can be combined on one server computing device or separated individually or into groups on several server computing devices. In some embodiments, the server 130 may include additional or fewer components than illustrated in FIG. 1A.

The network 110 includes any wired network, wireless network, or combination thereof. For example, the network 110 may be a personal area network, local area network, wide area network, over-the-air broadcast network (e.g., for radio or television), cable network, satellite network, cellular telephone network, or combination thereof. As a further example, the network 110 may be a publicly accessible network of linked networks, possibly operated by various distinct parties, such as the Internet. In some embodiments, the network 110 may be a private or semi-private network, such as a corporate or university intranet. The network 110 may include one or more wireless networks, such as a Global System for Mobile Communications (GSM) network, a Code Division Multiple Access (CDMA) network, a Long Term Evolution (LTE) network, or any other type of wireless network. The network 110 can use protocols and components for communicating via the Internet or any of the other aforementioned types of networks. For example, the protocols used by the network 110 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The server 130 can include a navigation unit 140, a vehicle data processing unit 145, and a data store 150. The navigation unit 140 can assist with location-based services. For example, the navigation unit 140 can facilitate the transportation of a user (also referred to herein as a "rider") and/or an object (e.g., food, packages, etc.) by another user (also referred to herein as a "driver") from a first location (also referred to herein as a "pickup location") to a second location (also referred to herein as a "destination location"). The navigation unit 140 may facilitate user and/or object transportation by providing map and/or navigation instructions to an application running on a user device 102 of a rider, to an application running on a user device 102 of a driver, and/or to a navigational system running on a vehicle 120.

As an example, the navigation unit 140 can include a matching service (not shown) that pairs a rider requesting a trip from a pickup location to a destination location with a driver that can complete the trip. The matching service may interact with an application running on the user device 102 of the rider and/or an application running on the user device 102 of the driver to establish the trip for the rider and/or to process payment from the rider to the driver.

The navigation unit 140 can also communicate with the application running on the user device 102 of the driver during the trip to obtain trip location information from the user device 102 (e.g., via a global position system (GPS) component coupled to and/or embedded within the user device 102) and provide navigation directions to the application that aid the driver in traveling from the current location of the driver to the destination location. The navigation unit 140 can also direct the driver to various geographic locations or points of interest, regardless of whether the driver is carrying a rider.

The vehicle data processing unit 145 can be configured to support vehicle 120 driver-assist features and/or to support autonomous driving. For example, the vehicle data processing unit 145 can generate and/or transmit to a vehicle 120 map data, run diagnostic models to identify vehicle 120 operational issues, run models to simulate vehicle 120 performance given a set of variables, use vehicle data provided by a vehicle 120 to identify an object and transmit an identification of the object to the vehicle 120, generate and/or transmit to a vehicle 120 vehicle 120 control instructions, and/or the like.

The data store 150 can store various types of data used by the navigation unit 140, the vehicle data processing unit 145, the user devices 102, and/or the vehicles 120. For example, the data store 150 can store user data 152, map data 154, search data 156, and log data 158.

The user data 152 may include information on some or all of the users registered with a location-based service, such as drivers and riders. The information may include, for example, usernames, passwords, names, addresses, billing information, data associated with prior trips taken or serviced by a user, user rating information, user loyalty program information, and/or the like.

The map data 154 may include high definition (HD) maps generated from sensors (e.g., light detection and ranging (LiDAR) sensors, radio detection and ranging (RADAR) sensors, infrared cameras, visible light cameras, stereo cameras, an inertial measurement unit (IMU), etc.), satellite imagery, optical character recognition (OCR) performed on captured street images (e.g., to identify names of streets, to identify street sign text, to identify names of points of interest, etc.), etc.; information used to calculate routes; information used to render 2D and/or 3D graphical maps; and/or the like. For example, the map data 154 can include elements like the layout of streets and intersections, bridges (e.g., including information on the height and/or width of bridges over streets), off-ramps, buildings, parking structure entrances and exits (e.g., including information on the height and/or width of the vehicle entrances and/or exits), the placement of street signs and stop lights, emergency turn-offs, points of interest (e.g., parks, restaurants, fuel stations, attractions, landmarks, etc., and associated names), road markings (e.g., centerline markings dividing lanes of opposing traffic, lane markings, stop lines, left turn guide lines, right turn guide lines, crosswalks, bus lane markings, bike lane markings, island marking, pavement text, highway exist and entrance markings, etc.), curbs, rail lines, waterways, turning radiuses and/or angles of left and right turns, the distance and dimensions of road features, the placement of barriers between two-way traffic, and/or the like, along with the elements' associated geographical locations (e.g., geographical coordinates). The map data 154 can also include reference data, such as real-time and/or historical traffic information, current and/or predicted weather conditions, road work information, information regarding laws and regulations (e.g., speed limits, whether right turns on red lights are permitted or prohibited, whether U-turns are permitted or prohibited, permitted direction of travel, and/or the like), news events, and/or the like.

While the map data 154 is illustrated as being stored in the data store 150 of the server 130, this is not meant to be limiting. For example, the server 130 can transmit the map data 154 to a vehicle 120 for storage therein (e.g., in the data store 129, described below).

The search data 156 can include searches entered by various users in the past. For example, the search data 156 can include textual searches for pickup and/or destination locations. The searches can be for specific addresses, geographical locations, names associated with a geographical location (e.g., name of a park, restaurant, fuel station, attraction, landmark, etc.), etc.

The log data 158 can include vehicle data provided by one or more vehicles 120. For example, the vehicle data can include route data, sensor data, perception data, vehicle 120 control data, vehicle 120 component fault and/or failure data, etc.

Figure 1B:
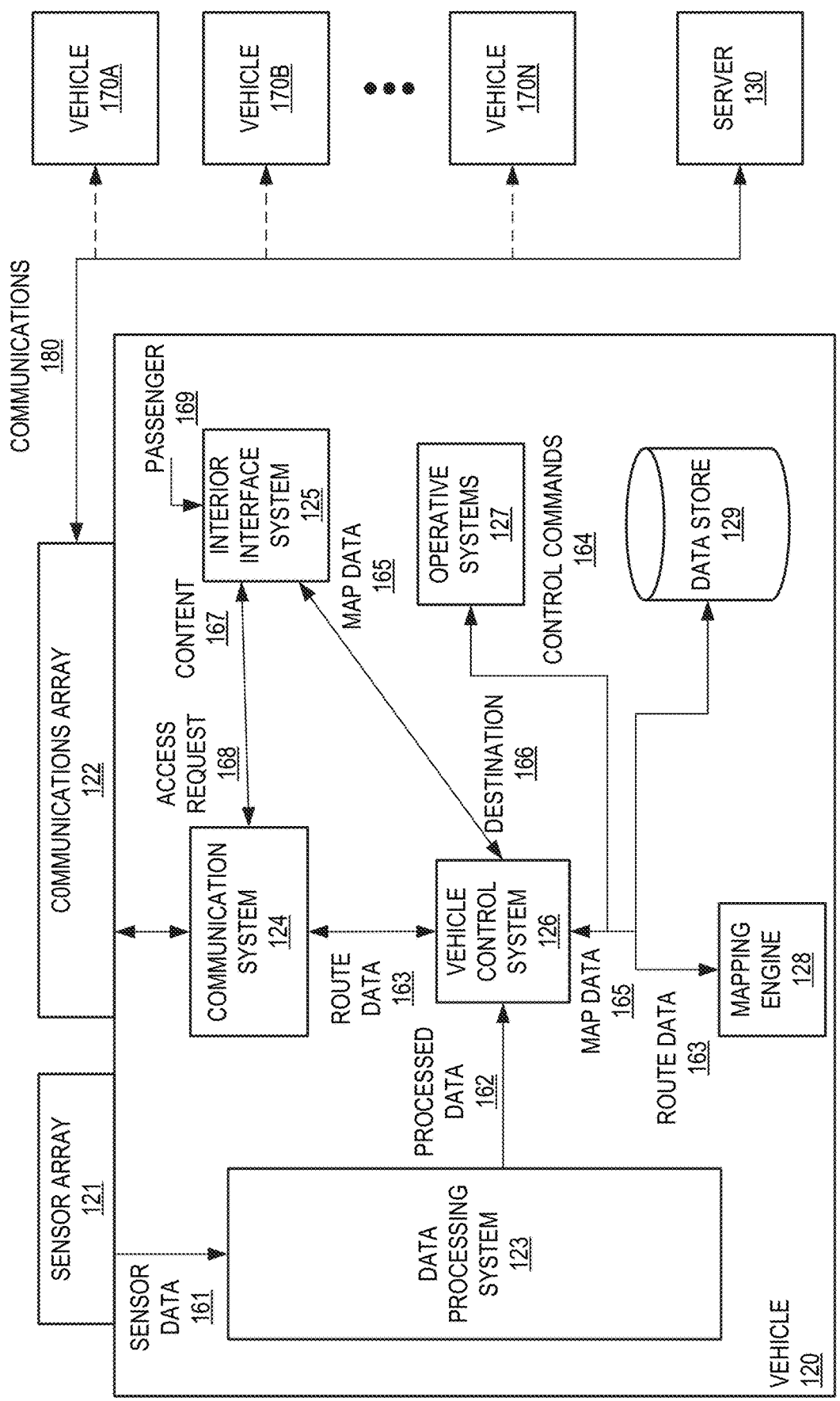
FIG. 1B illustrates a block diagram showing the vehicle of FIG. 1A in communication with one or more other vehicles and/or the server of FIG. 1A, according to one embodiment.

FIG. 1B illustrates a block diagram showing the vehicle 120 of FIG. 1A in communication with one or more other vehicles 170A-N and/or the server 130 of FIG. 1A, according to one embodiment. As illustrated in FIG. 1B, the vehicle 120 can include various components and/or data stores. For example, the vehicle 120 can include a sensor array 121, a communications array 122, a data processing system 123, a communication system 124, an interior interface system 125, a vehicle control system 126, operative systems 127, a mapping engine 128, and/or a data store 129.

Communications 180 may be transmitted and/or received between the vehicle 120, one or more vehicles 170A-N, and/or the server 130. The server 130 can transmit and/or receive data from the vehicle 120 as described above with respect to FIG. 1A. For example, the server 130 can transmit vehicle control instructions or commands (e.g., as communications 180) to the vehicle 120. The vehicle control instructions can be received by the communications array 122 (e.g., an array of one or more antennas configured to transmit and/or receive wireless signals), which is operated by the communication system 124 (e.g., a transceiver). The communication system 124 can transmit the vehicle control instructions to the vehicle control system 126, which can operate the acceleration, steering, braking, lights, signals, and other operative systems 127 of the vehicle 120 in order to drive and/or maneuver the vehicle 120 and/or assist a driver in driving and/or maneuvering the vehicle 120 through road traffic to destination locations specified by the vehicle control instructions.

As an example, the vehicle control instructions can include route data 163, which can be processed by the vehicle control system 126 to maneuver the vehicle 120 and/or assist a driver in maneuvering the vehicle 120 along a given route (e.g., an optimized route calculated by the server 130 and/or the mapping engine 128) to the specified destination location. In processing the route data 163, the vehicle control system 126 can generate control commands 164 for execution by the operative systems 127 (e.g., acceleration, steering, braking, maneuvering, reversing, etc.) to cause the vehicle 120 to travel along the route to the destination location and/or to assist a driver in maneuvering the vehicle 120 along the route to the destination location.

A destination location 166 may be specified by the server 130 based on user requests (e.g., pickup requests, delivery requests, etc.) transmitted from applications running on user devices 102. Alternatively or in addition, a passenger and/or driver of the vehicle 120 can provide user input(s) 169 through an interior interface system 125 (e.g., a vehicle navigation system) to provide a destination location 166. In some embodiments, the vehicle control system 126 can transmit the inputted destination location 166 and/or a current location of the vehicle 120 (e.g., as a GPS data packet) as a communication 180 to the server 130 via the communication system 124 and the communications array 122. The server 130 (e.g., the navigation unit 140) can use the current location of the vehicle 120 and/or the inputted destination location 166 to perform an optimization operation to determine an optimal route for the vehicle 120 to travel to the destination location 166. Route data 163 that includes the optimal route can be transmitted from the server 130 to the vehicle control system 126 via the communications array 122 and the communication system 124. As a result of receiving the route data 163, the vehicle control system 126 can cause the operative systems 127 to maneuver the vehicle 120 through traffic to the destination location 166 along the optimal route, assist a driver in maneuvering the vehicle 120 through traffic to the destination location 166 along the optimal route, and/or cause the interior interface system 125 to display and/or present instructions for maneuvering the vehicle 120 through traffic to the destination location 166 along the optimal route.

Alternatively or in addition, the route data 163 includes the optimal route and the vehicle control system 126 automatically inputs the route data 163 into the mapping engine 128. The mapping engine 128 can generate map data 165 using the optimal route (e.g., generate a map showing the optimal route and/or instructions for taking the optimal route) and provide the map data 165 to the interior interface system 125 (e.g., via the vehicle control system 126) for display. The map data 165 may include information derived from the map data 154 stored in the data store 150 on the server 130. The displayed map data 165 can indicate an estimated time of arrival and/or show the progress of the vehicle 120 along the optimal route. The displayed map data 165 can also include indicators, such as reroute commands, emergency notifications, road work information, real-time traffic data, current weather conditions, information regarding laws and regulations (e.g., speed limits, whether right turns on red lights are permitted or prohibited, where U-turns are permitted or prohibited, permitted direction of travel, etc.), news events, and/or the like.

The user input 169 can also be a request to access a network (e.g., the network 110). In response to such a request, the interior interface system 125 can generate an access request 168, which can be processed by the communication system 124 to configure the communications array 122 to transmit and/or receive data corresponding to a user's interaction with the interior interface system 125 and/or with a user device 102 in communication with the interior interface system 125 (e.g., a user device 102 connected to the interior interface system 125 via a wireless connection). For example, the vehicle 120 can include on-board Wi-Fi, which the passenger(s) and/or driver can access to send and/or receive emails and/or text messages, stream audio and/or video content, browse content pages (e.g., network pages, web pages, etc.), and/or access applications that use network access. Based on user interactions, the interior interface system 125 can receive content 167 via the network 110, the communications array 122, and/or the communication system 124. The communication system 124 can dynamically manage network access to avoid or minimize disruption of the transmission of the content 167.

The sensor array 121 can include any number of one or more types of sensors, such as a satellite-radio navigation system (e.g., GPS), a LiDAR sensor, a landscape sensor (e.g., a radar sensor), an IMU, a camera (e.g., an infrared camera, a visible light camera, stereo cameras, etc.), a Wi-Fi detection system, a cellular communication system, an inter-vehicle communication system, a road sensor communication system, feature sensors, proximity sensors (e.g., infrared, electromagnetic, photoelectric, etc.), distance sensors, depth sensors, and/or the like. The satellite-radio navigation system may compute the current position (e.g., within a range of 1-10 meters) of the vehicle 120 based on an analysis of signals received from a constellation of satellites.

The LiDAR sensor, the radar sensor, and/or any other similar types of sensors can be used to detect the vehicle 120 surroundings while the vehicle 120 is in motion or about to begin motion. For example, the LiDAR sensor may be used to bounce multiple laser beams off approaching objects to assess their distance and to provide accurate 3D information on the surrounding environment. The data obtained from the LiDAR sensor may be used in performing object identification, motion vector determination, collision prediction, and/or in implementing accident avoidance processes. Optionally, the LiDAR sensor may provide a 360° view using a rotating, scanning mirror assembly. The LiDAR sensor may optionally be mounted on a roof of the vehicle 120.

The IMU may include X, Y, Z oriented gyroscopes and/or accelerometers. The IMU provides data on the rotational and linear motion of the vehicle 120, which may be used to calculate the motion and position of the vehicle 120.

Cameras may be used to capture visual images of the environment surrounding the vehicle 120. Depending on the configuration and number of cameras, the cameras may provide a 360° view around the vehicle 120. The images from the cameras may be used to read road markings (e.g., lane markings), read street signs, detect objects, and/or the like.

The Wi-Fi detection system and/or the cellular communication system may be used to perform triangulation with respect to Wi-Fi hot spots or cell towers respectively, to determine the position of the vehicle 120 (optionally in conjunction with then satellite-radio navigation system).

The inter-vehicle communication system (which may include the Wi-Fi detection system, the cellular communication system, and/or the communications array 122) may be used to receive and/or transmit data to the other vehicles 170A-N, such as current speed and/or location coordinates of the vehicle 120, time and/or location coordinates corresponding to when deceleration is planned and the planned rate of deceleration, time and/or location coordinates when a stop operation is planned, time and/or location coordinates when a lane change is planned and direction of lane change, time and/or location coordinates when a turn operation is planned, time and/or location coordinates when a parking operation is planned, and/or the like.

The road sensor communication system (which may include the Wi-Fi detection system and/or the cellular communication system) may be used to read information from road sensors (e.g., indicating the traffic speed and/or traffic congestion) and/or traffic control devices (e.g., traffic signals).

When a user requests transportation (e.g., via the application running on the user device 102), the user may specify a specific destination location. The origination location may be the current location of the vehicle 120, which may be determined using the satellite-radio navigation system installed in the vehicle (e.g., GPS, Galileo, BeiDou/COMPASS, DORIS, GLONASS, and/or other satellite-radio navigation system), a Wi-Fi positioning System, cell tower triangulation, and/or the like. Optionally, the origination location may be specified by the user via a user interface provided by the vehicle 120 (e.g., the interior interface system 125) or via the user device 102 running the application. Optionally, the origination location may be automatically determined from location information obtained from the user device 102. In addition to the origination location and destination location, one or more waypoints may be specified, enabling multiple destination locations.

Raw sensor data 161 from the sensor array 121 can be processed by the on-board data processing system 123. The processed data 162 can then be sent by the data processing system 123 to the vehicle control system 126, and optionally sent to the server 130 via the communication system 124 and the communications array 122.

The data store 129 can store map data (e.g., the map data 154) and/or a subset of the map data 154 (e.g., a portion of the map data 154 corresponding to a general region in which the vehicle 120 is currently located). In some embodiments, the vehicle 120 can use the sensor array 121 to record updated map data along traveled routes, and transmit the updated map data to the server 130 via the communication system 124 and the communications array 122. The server 130 can then transmit the updated map data to one or more of the vehicles 170A-N and/or further process the updated map data.

The data processing system 123 can provide continuous or near continuous processed data 162 to the vehicle control system 126 to respond to point-to-point activity in the surroundings of the vehicle 120. The processed data 162 can comprise comparisons between the raw sensor data 161— which represents an operational environment of the vehicle 120, and which is continuously collected by the sensor array 121—and the map data stored in the data store 129. In an example, the data processing system 123 is programmed with machine learning or other artificial intelligence capabilities to enable the vehicle 120 to identify and respond to conditions, events, and/or potential hazards. In variations, the data processing system 123 can continuously or nearly continuously compare raw sensor data 161 to stored map data in order to perform a localization to continuously or nearly continuously determine a location and/or orientation of the vehicle 120. Localization of the vehicle 120 may allow the vehicle 120 to become aware of an instant location and/or orientation of the vehicle 120 in comparison to the stored map data in order to maneuver the vehicle 120 on surface streets through traffic and/or assist a driver in maneuvering the vehicle 120 on surface streets through traffic and identify and respond to potential hazards (e.g., pedestrians) or local conditions, such as weather or traffic conditions.

Furthermore, localization can enable the vehicle 120 to tune or beam steer the communications array 122 to maximize a communication link quality and/or to minimize interference with other communications from other vehicles 170A-N. For example, the communication system 124 can beam steer a radiation patterns of the communications array 122 in response to network configuration commands received from the server 130. The data store 129 may store current network resource map data that identifies network base stations and/or other network sources that provide network connectivity. The network resource map data may indicate locations of base stations and/or available network types (e.g., 3G, 4G, LTE, Wi-Fi, etc.) within a region in which the vehicle 120 is located.

While FIG. 1B describes certain operations as being performed by the vehicle 120 or the server 130, this is not meant to be limiting. The operations performed by the vehicle 120 and the server 130 as described herein can be performed by either entity. For example, certain operations normally performed by the server 130 (e.g., transmitting updating map data to the vehicles 170A-N) may be performed by the vehicle 120 for load balancing purposes (e.g., to reduce the processing load of the server 130, to take advantage of spare processing capacity on the vehicle 120, etc.).

Furthermore, any of the vehicles 170A-N may include some or all of the components of the vehicle 120 described herein. For example, a vehicle 170A-N can include a communications array 122 to communicate with the vehicle 120 and/or the server 130.

Figure 2:
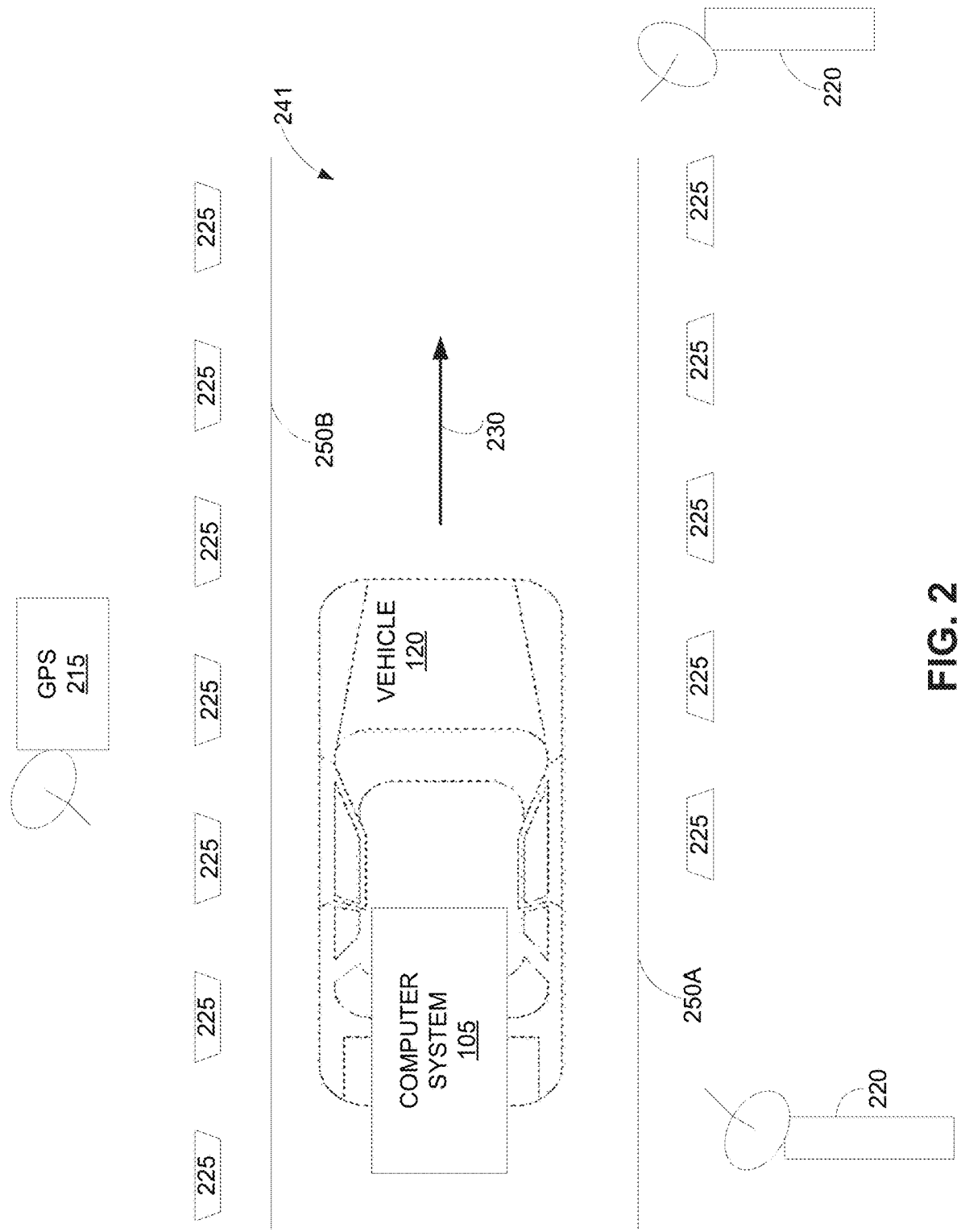
FIG. 2 is a schematic illustrating a vehicle moving along a road and examples of components that the vehicle may use to determine its geographical location information.

FIG. 2 is a schematic illustrating an example a vehicle 120 moving along a road 241. The road 241 may be part of the route from the first point to a second point that the vehicle 120 is controlled to manually, semi-autonomously (e.g., by assisting a driver), and/or autonomously traverse. In FIG. 2, vehicle 120 is moving along the road 241 at a speed and in a direction indicated by motion vector 230. FIG. 2 also illustrates examples of positioning components that provide to the vehicle 120, either passively or actively, geographical location information that the vehicle 120 may use to determine a location (e.g., a geographic location) of the vehicle 120.

As the vehicle 120 moves along the road 241, positioning components that are along the road 241 or in communication with sensors on the vehicle 120 may be used to help control the vehicle 120. FIG. 2 illustrates a few examples of such positioning components. Proximal positioning components 250A, 250B may run along the road 241. In various embodiments, such components may be contiguous or closely arranged, and may either be passive (sensed by a sensor on the vehicle 120, e.g., be reflective of a transmitting sensor on the vehicle 120, or be sensed by an IR or optical sensor), or active (e.g., transmit radiation sensed by the vehicle 120). One or more distal positioning components 225 may be arranged beside the road or off the road as certain distance. The distal positioning components 225 may also be active or passive, and various embodiments. In some embodiments, a GPS transmitter 215 may provide GPS signals that are received by the vehicle 120. In some embodiments, one or more fixed transmitters 220 may be disposed along the road 241, and provide the vehicle 120 with transmissions or communications that help the vehicle determine its location.

In various embodiments, the vehicle 120 may include a sensor system as part of a computer system 105, or may include a sensor system on the vehicle that interfaces with the computer system 105. The computer system 105 may include any of the components of the vehicle 120 described above with respect to FIG. 1B. In various embodiments, the sensor system may include one or more sensors configured to sense information about an environment in which the vehicle 120 is located. In various embodiments, the one or more sensors may include, one or more of a Global Positioning System (GPS) module, an inertial measurement unit (IMU), a radio detection and ranging (RADAR) unit, a laser rangefinder and/or light detection and ranging (LIDAR) unit, an infrared (IR) camera, and/or an optical camera. The GPS module may be any sensor configured to estimate a geographic location of the vehicle 120. To this end, the GPS module may include a transceiver configured to estimate a position of the automobile 100 with respect to the Earth, based on satellite-based positioning data. In an example, the computer system 105 may be configured to use the GPS module in combination with the map data to estimate a location of a lane boundary on road on which the vehicle 120 may be travelling on.

The IMU may be any combination of sensors configured to sense position and orientation changes of the vehicle 120 based on inertial acceleration. In some examples, the combination of sensors may include, for example, accelerometers and gyroscopes. Other combinations of sensors are possible as well.

The RADAR unit may be considered as an object detection system that may be configured to use radio waves to determine characteristics of the object such as range, altitude, direction, or speed of the object. The RADAR unit may be configured to transmit pulses of radio waves or microwaves that may bounce off any object in a path of the waves. The object may return a part of energy of the waves to a receiver (e.g., dish or antenna), which may be part of the RADAR unit as well. The RADAR unit also may be configured to perform digital signal processing of received signals (bouncing off the object) and may be configured to identify the object.

Other systems similar to RADAR have been used in other parts of the electromagnetic spectrum. One example is LIDAR (light detection and ranging), which may be configured to use visible light from lasers rather than radio waves.

The LIDAR unit may include a sensor configured to sense or detect objects in an environment in which the vehicle 120 is located using light. Generally, LIDAR is an optical remote sensing technology that can measure distance to, or other properties of, a target by illuminating the target with light. As an example, the LIDAR unit may include a laser source and/or laser scanner configured to emit laser pulses and a detector configured to receive reflections of the laser pulses. For example, the LIDAR unit may include a laser range finder reflected by a rotating mirror, and the laser is scanned around a scene being digitized, in one or two dimensions, gathering distance measurements at specified angle intervals. In examples, the LIDAR unit may include components such as light (e.g., laser) source, scanner and optics, photo-detector and receiver electronics, and position and navigation system.

In an example, The LIDAR unit may be configured to use ultraviolet (UV), visible, or infrared light to image objects and can be used with a wide range of targets, including non-metallic objects. In one example, a narrow laser beam can be used to map physical features of an object with high resolution.

In examples, wavelengths in a range from about 10 micrometers (infrared) to about 250 nm (UV) could be used. Typically light is reflected via backscattering. Different types of scattering are used for different LIDAR applications, such as Rayleigh scattering, Mie scattering and Raman scattering, as well as fluorescence. Based on different kinds of backscattering, LIDAR can be accordingly called Rayleigh LIDAR, Mie LIDAR, Raman LIDAR and Na/Fe/K Fluorescence LIDAR, as examples. Suitable combinations of wavelengths can allow for remote mapping of objects by looking for wavelength-dependent changes in intensity of reflected signals, for example.

Three-dimensional (3D) imaging can be achieved using both scanning and non-scanning LIDAR systems. "3D gated viewing laser radar" is an example of a non-scanning laser ranging system that applies a pulsed laser and a fast gated camera. Imaging LIDAR can also be performed using an array of high speed detectors and a modulation sensitive detectors array typically built on single chips using CMOS (complementary metal-oxide-semiconductor) and hybrid CMOS/CCD (charge-coupled device) fabrication techniques. In these devices, each pixel may be processed locally by demodulation or gating at high speed such that the array can be processed to represent an image from a camera. Using this technique, many thousands of pixels may be acquired simultaneously to create a 3D point cloud representing an object or scene being detected by the LIDAR unit.

A point cloud may include a set of vertices in a 3D coordinate system. These vertices may be defined by X, Y, and Z coordinates, for example, and may represent an external surface of an object. The LIDAR unit may be configured to create the point cloud by measuring a large number of points on the surface of the object, and may output the point cloud as a data file. As the result of a 3D scanning process of the object by the LIDAR unit, the point cloud can be used to identify and visualize the object. In one example, the point cloud can be directly rendered to visualize the object. In another example, the point cloud may be converted to polygon or triangle mesh models through a process that may be referred to as surface reconstruction. Example techniques for converting a point cloud to a 3D surface may include Delaunay triangulation, alpha shapes, and ball pivoting. These techniques include building a network of triangles over existing vertices of the point cloud. Other example techniques may include converting the point cloud into a volumetric distance field and reconstructing an implicit surface so defined through a marching cubes algorithm.

The camera may be any camera (e.g., a still camera, a video camera, etc.) configured to capture images of the environment in which the vehicle 120 is located. To this end, the camera may be configured to detect visible light, or may be configured to detect light from other portions of the spectrum, such as infrared or ultraviolet light. Other types of cameras are possible as well. The camera may be a two-dimensional detector, or may have a three-dimensional spatial range. In some examples, the camera may be, for example, a range detector configured to generate a two-dimensional image indicating a distance from the camera to a number of points in the environment. To this end, the camera may use one or more range detecting techniques. For example, the camera may be configured to use a structured light technique in which the vehicle 120 illuminates an object in the environment with a predetermined light pattern, such as a grid or checkerboard pattern and uses the camera to detect a reflection of the predetermined light pattern off the object. Based on distortions in the reflected light pattern, the vehicle 120 may be configured to determine the distance to the points on the object. The predetermined light pattern may comprise infrared light, or light of another wavelength. The sensor system may additionally or alternatively include components other than those described here.

Figure 3:
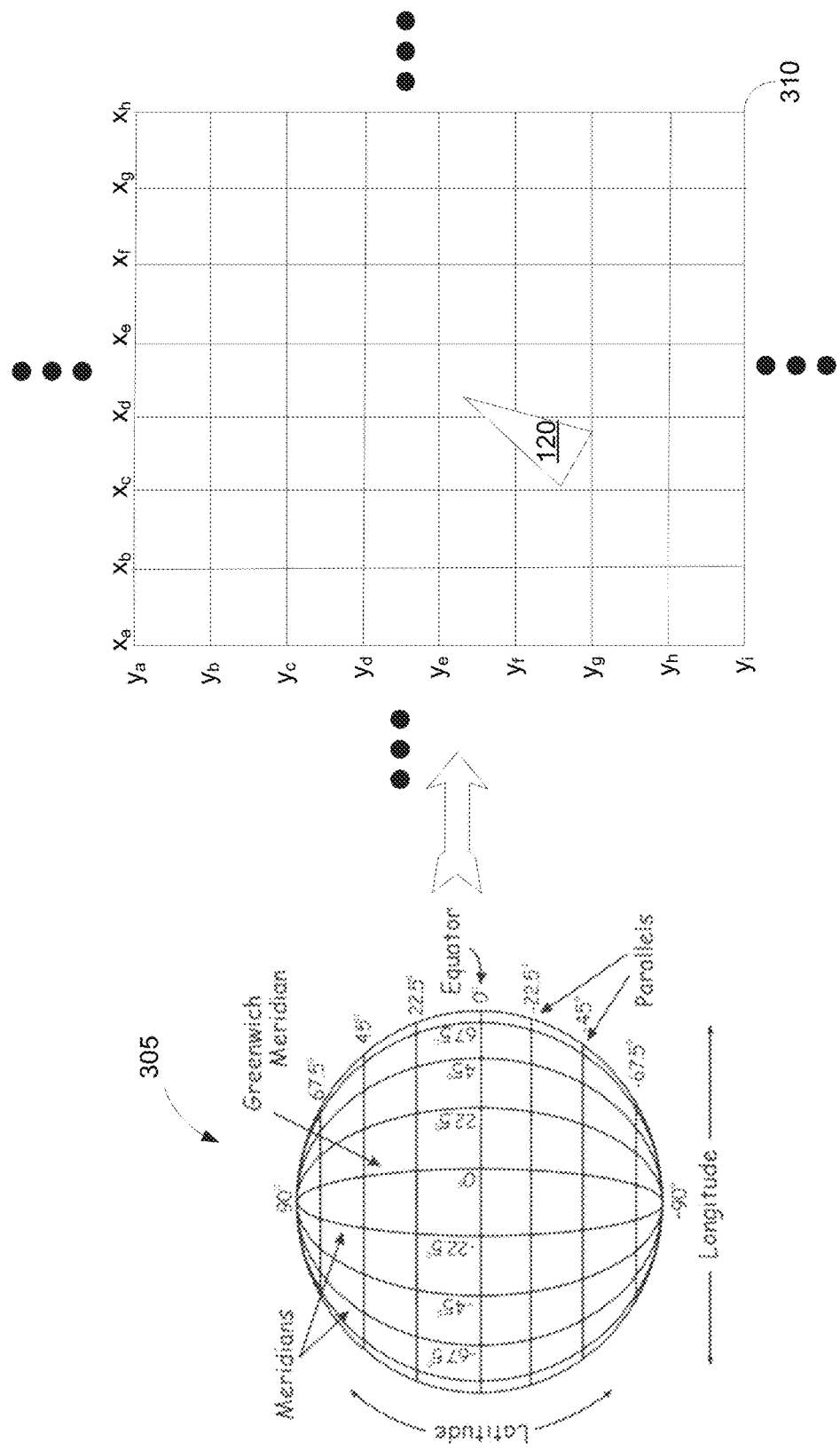
FIG. 3 is a schematic illustrating an example of map data that may be represented by a plurality of map data tile.

FIG. 3 is a schematic illustrating an example of map data that may be represented by a plurality of map data tiles 310. Map data may be represented in a number of ways. As illustrated in FIG. 3, locations on the earth 305 may be referenced by lines of latitude and lines of longitude. For a particular location on earth of a vehicle 120, the latitude and longitude information may be represented by a plurality of map data tiles 310 arranged in a grid around the vehicle 120. Due to the latitude/longitude reference system and the shape of the earth, geographic distances between incremental lines of latitudes are consistent. However, geographic distances between incremental lines of longitude depend on the location on the earth, being closer together at the poles. Accordingly, grid patterns of map data representing a portion of earth that are designated in reference to longitudes and latitudes (as many typically are) may not be exactly rectangular, and they will be less rectangular closer to the poles. For the purpose of this disclosure, map data tiles 310 that depict map data representing a portion of the earth will be assumed to be rectangular, or substantially rectangular, due in part to the relatively small size of the map data tiles 310. The map data referred to herein does not necessarily need to be referenced in terms of longitude and latitude. Instead, other coordinate reference systems may be used.

Figure 4:
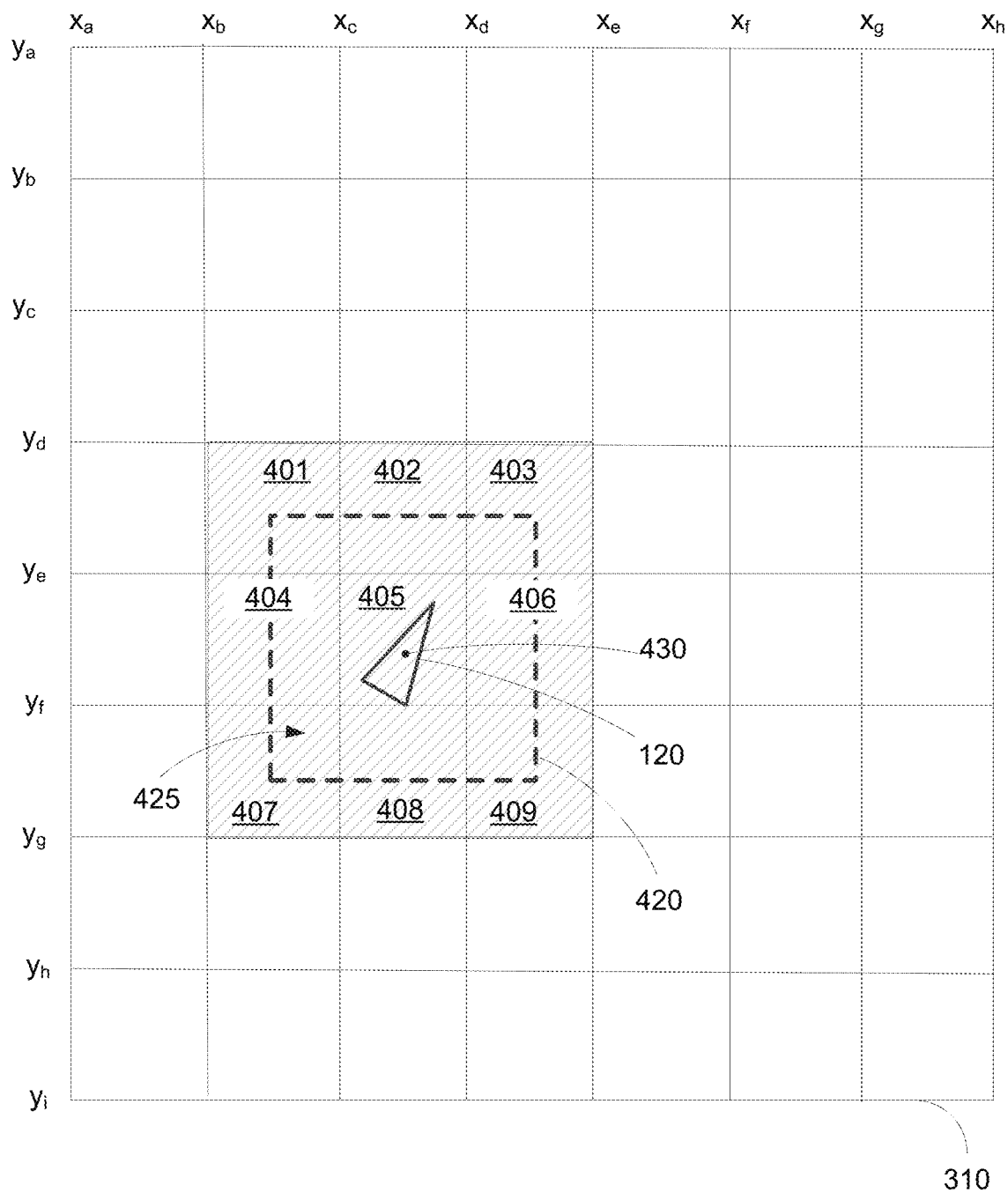
FIG. 4 is a schematic illustrating an example of map data that may be loaded into memory based on a vehicle initial (or first) geographic location, the map data including a plurality of map data tiles where at least a portion of each of the plurality of map data tiles fall within a boundary defining a contiguous boundary area around the geographic location of the vehicle.

FIG. 4 is a schematic illustrating an example of map data that may be loaded into memory based on a vehicle initial (or first) geographic location, the map data including a plurality of map data tiles where at least a portion of each of the plurality of map data tiles fall within a boundary defining a contiguous boundary area around the geographic location of the vehicle. Vehicle 120 is shown as being located in a certain location 430 for which there is corresponding available map data information surrounding the vehicle 120 on all sides, as depicted by the plurality of map data tiles 310. In the reference to the location of the vehicle 120 at location 430, the computer system 105 or a device that includes a computer system 105 is understood to be at the same location 430 of the vehicle 120, and thus terms may have the same connotation and be used interchangeably, unless the context indicates otherwise.

At any one time, although the plurality of map data tiles 310 may be available to be provided by a storage component, only certain map data tiles are loaded into the memory of the vehicle, illustrated in FIG. 4 as map data tiles 401-409. As used herein, the "memory of the vehicle" refers to a memory location where a processor can retrieve the stored information, for example, a chip-based memory (e.g., RAM, DRAM, cache memory on the processor, etc.) and not a disc-based memory/storage location.

A determined boundary 420 is established around the initial location of the vehicle 430. The boundary 420 is a representation of a certain distance and shape around the vehicle 430, and encloses a geographical boundary area 425 around the vehicle 430. In the illustrated embodiment, the boundary 420 is a square centered on the initial location of the vehicle 430. In this embodiment, at least these nine map data tiles 401-409 are loaded into the memory of the vehicle 120. In other embodiments, the boundary 420 may have other shapes and extend outward from the vehicle 120 to different distance. For example, the boundary 420 may be in the shape of a rectangular, a circle, or be a non-symmetric shape. For example, the boundary 420 may extend away from the vehicle 120 in the direction the vehicle 120 is moving, then it extends to the side and/or the back of the vehicle 120.

In this embodiment, the boundary 420 either intersects or surrounds the nine map data tiles 401-409. In other embodiments, the boundary 420 may intersect or surround a larger or smaller number of map data tiles, depending on the size of the map data tiles in the size and the shape of the boundary 420.

Figure 5:
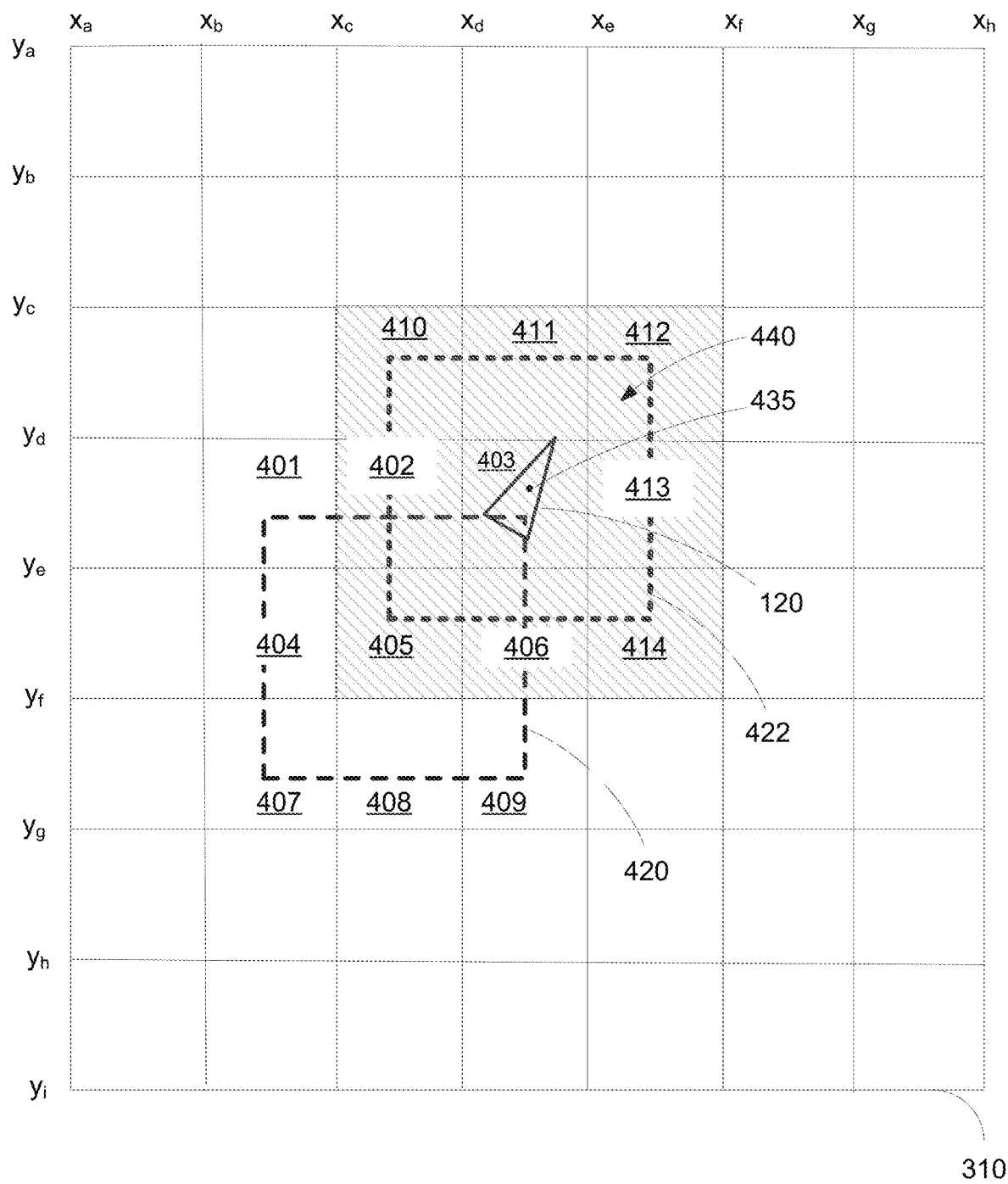
FIG. 5 is a schematic illustrating an example of map data that may be loaded into memory based on a vehicle updated (or second) geographic location, the map data including a plurality of map data tiles where at least a portion of each of the plurality of map data tiles fall within a boundary defining a contiguous boundary area around the updated geographic location of the vehicle.

FIG. 5 is a schematic illustrating an example of map data that may be loaded into memory based on an updated (or second) geographic location of the vehicle 120, the map data including a plurality of map data tiles 402, 403, 405, 406, 410, 411, 412, 413, 414, where at least a portion of each of the plurality of map data tiles 402, 403, 405, 406, 410, 411, 412, 413, 414 fall within an updated boundary 422 defining a boundary area around the updated geographic location 435 of the vehicle 120. FIG. 5 illustrates the initial boundary 420 that intersects or surrounds map data tiles 401-409 that are centered on the initial geographic location 430 of the vehicle, and the updated boundary 422 that intersects or surrounds map data tiles 402, 403, 405, 406, 410, 411, 412, 413, 414 that are centered on the updated geographical location 435 of the vehicle 120. The updated boundary 422 surrounds and defines an updated geographic boundary area 440 around the vehicle 120 at the updated geographical location 435.

In operation, as the vehicle moves along a route, the system 105 determines an updated geographic position, for example, using one or more of the components described in reference to FIGS. 1B and/or 2. The system 105 determines whether the updated geographic position of the vehicle 120 corresponds to a location that is outside of the boundary area defined by the initial boundary 420 (outside of the initial boundary 420). If so, the system 105 loads additional map data tiles into memory and determines an updated boundary 422 which defines updated geographic boundary area 440. In this example, the system 105 loads map data tiles as needed such that map data tiles 402, 403, 405, 406, 410, 411, 412, 413, 414 are loaded into memory and can be used to control the vehicle 120. In this example, map data tiles 402, 403, 405, and 406 were already in memory based on the initial geographic location 430. Accordingly, the system 105 loads map data tiles 410, 411, 412, 413, and 414 into memory, retaining map data tiles 402, 403, 405, and 406 in memory. In some embodiments, the map data tiles that are loaded into memory and do not intersect or are surrounded by the updated boundary 422 are removed from memory (e.g., the memory space allocated for map data tiles 404, 407, 408, and 409 is marked as memory space that may be rewritten. This methodology may continue for subsequent updated geographical locations of the device along its entire route, each time loading additional map tile data as the vehicle location is determined to be outside of the updated geographic boundary area (e.g., indicating that the vehicle 120 is in an area corresponding to a location that is outside of the updated boundary 422).

Figure 6:
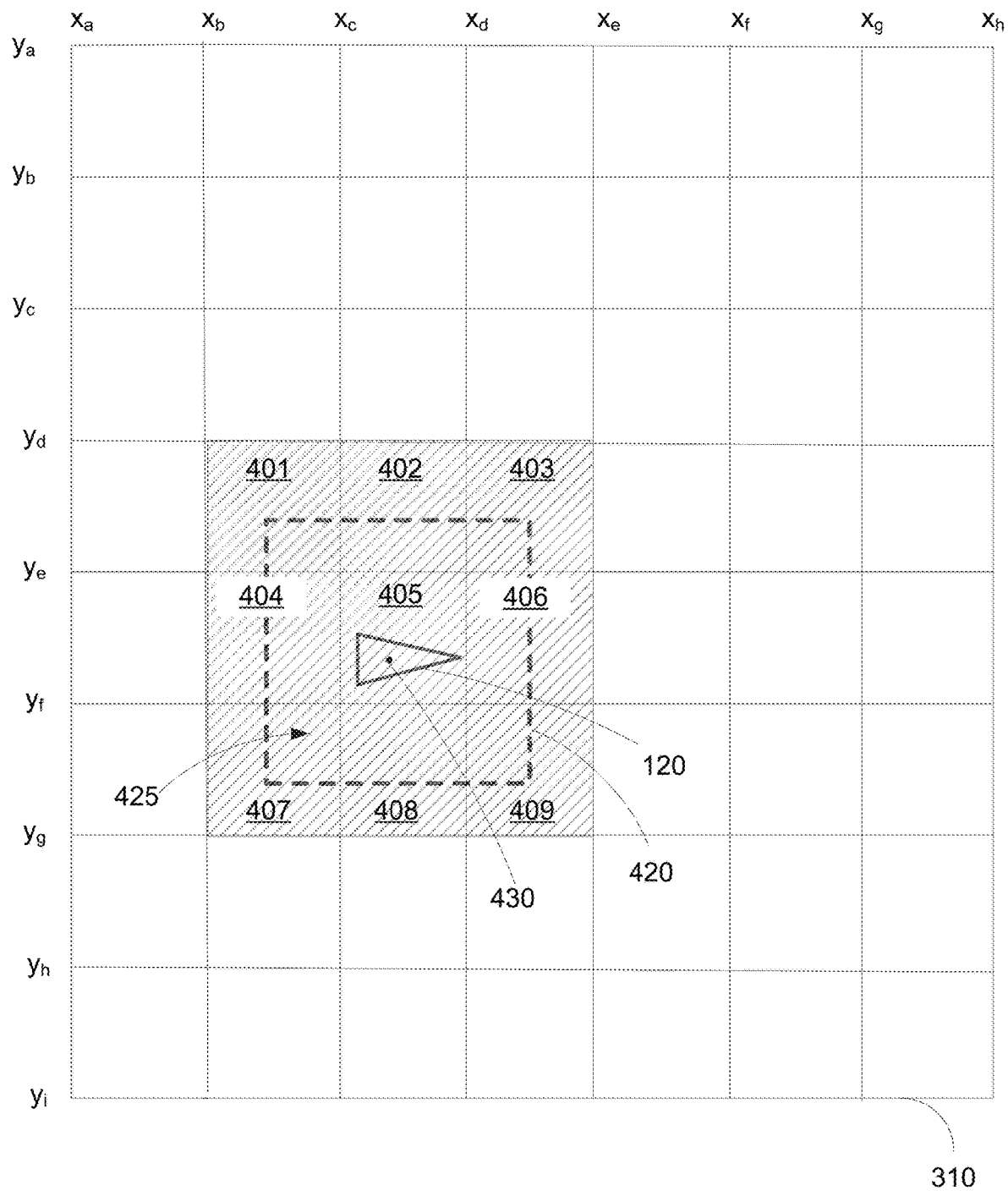
FIG. 6 is a schematic illustrating another example of map data that may be loaded into memory based on a vehicle initial (or first) geographic location, the map data including a plurality of map data tiles where at least a portion of each of the plurality of map data tiles fall within a boundary defining a contiguous boundary area around the geographic location of the vehicle.

FIG. 6 is a schematic illustrating another example of map data that may be loaded into memory based on a vehicle initial (or first) geographic location, the map data including a plurality of map data tiles where at least a portion of each of the plurality of map data tiles fall within a boundary defining a contiguous boundary area around the geographic location of the vehicle. In the example illustrated in FIG. 4 and FIG. 5, the vehicle 120 crossed the boundary 420 at a map data tile 403 that was in a corner of the nine map data tiles 401-409. Thus, as a result of the updated boundary 422 being established, five map data tiles 410, 411, 412, 413, 414 needed to be uploaded into memory such that, after the map data tiles were uploaded, an arrangement of nine map data tiles surrounded the updated geographic location 435.

Figure 7:
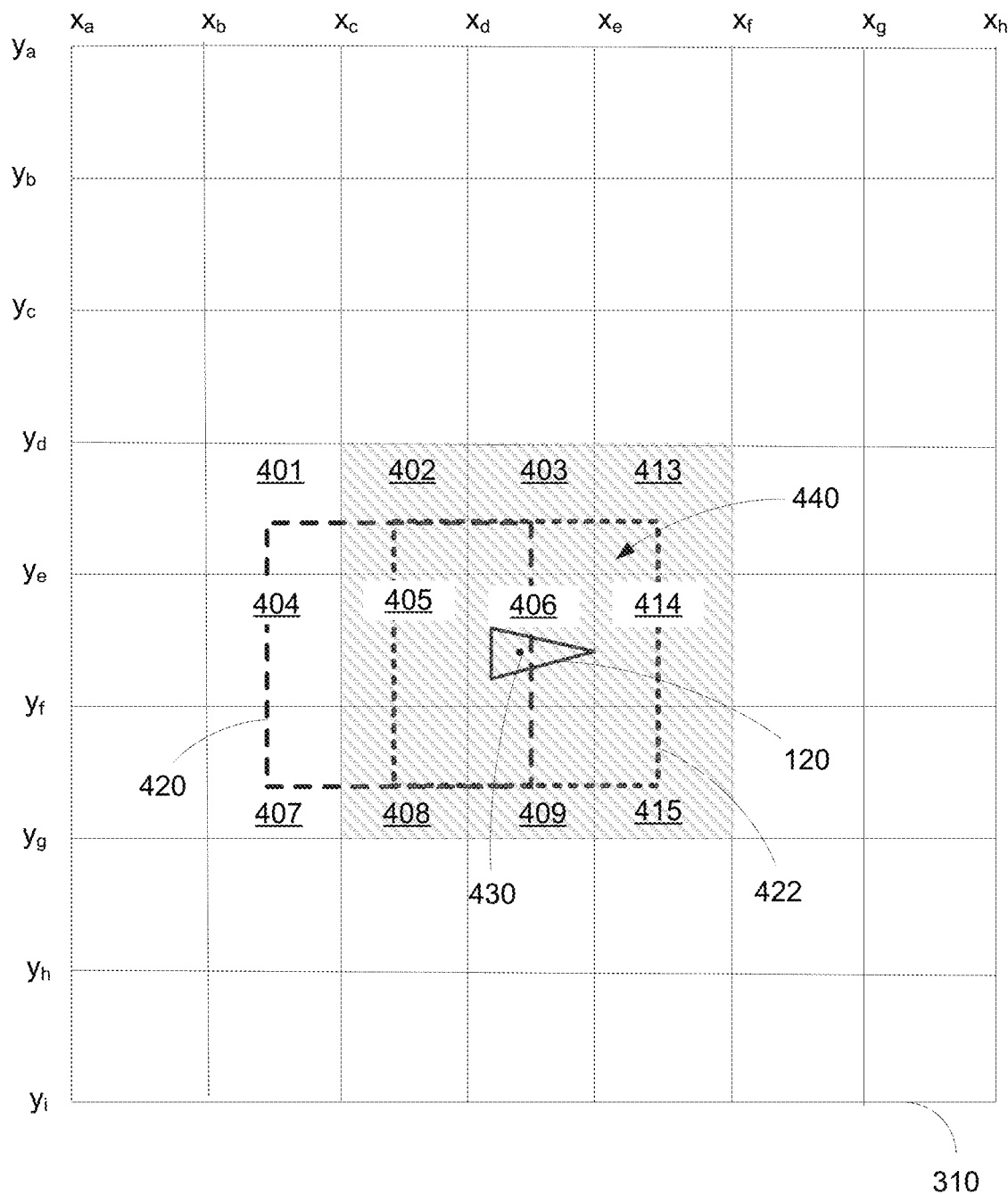
FIG. 7 is a schematic illustrating an example of map data that may be loaded into memory based on a vehicle updated (or second) geographic location, the map data including a plurality of map data tiles where at least a portion of each of the plurality of map data tiles fall within a boundary defining a contiguous boundary area around the updated geographic location of the vehicle.

FIG. 6 illustrates a similar initial starting position of the vehicle 120 and configuration of map data tiles as illustrated in FIG. 4 except that the direction of the vehicle 120 is towards map data tile 406 such that when the location of the vehicle 120 passes the boundary 420 the vehicle will be in a location that corresponds to map data tile 406, which is illustrated in FIG. 7. In FIG. 7 is a schematic illustrating an example of map data that may be loaded into memory based on a vehicle 120 updated (or second) geographic location. As the geographic location of the vehicle 120 passes the updated boundary 422 at a location that corresponds to a map data tile on the side of the arrangement of nine map data tiles, only three new map data tiles 413, 414, 415 need to be loaded into memory. In other words, because the updated boundary 422 is displaced laterally from the initial boundary 420, the updated boundary 422 only intersects map data tiles 413, 414, 415 that are not already in memory, so only these three map data tiles 413, 414, 415 are then loaded into memory.

The techniques described herein may be implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques. Computing device(s) are generally controlled and coordinated by operating system software. Conventional operating systems control and schedule computer processes for execution, perform memory management, provide file system, networking, I/O services, and provide a user interface functionality, such as a graphical user interface ("GUI"), among other things.

Figure 8:
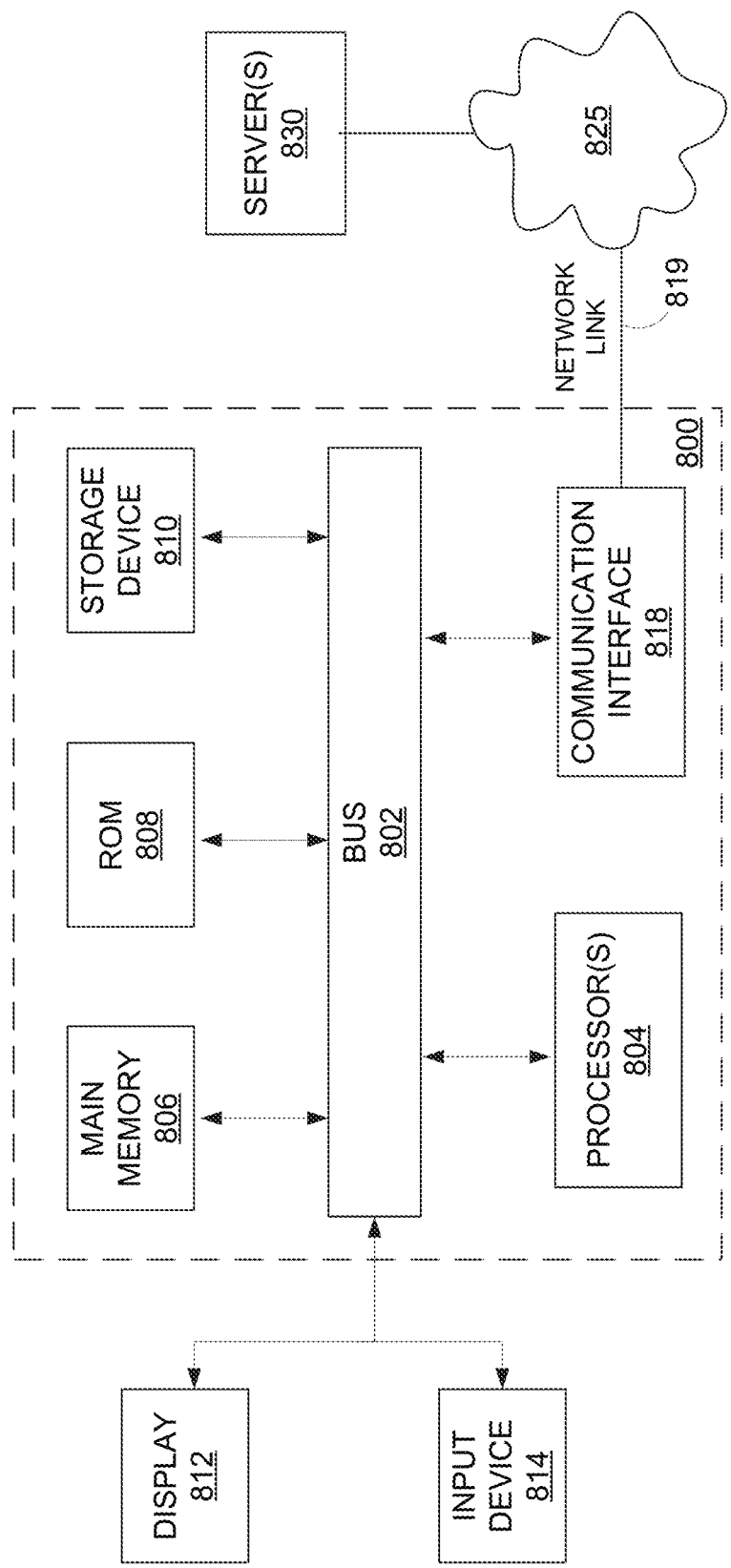
FIG. 8 is a schematic of an example of a computer system that can be on a vehicle and that can be used to perform the map data loading described herein.

FIG. 8 is a block diagram that illustrates a computer system 800 upon which any of the embodiments described herein may be implemented, for example, computer system 105 illustrated in FIG. 1. The system 800 may correspond identically to the system 105 described above, or have one or more different components. The computer system 800 includes a bus 802 or other communication mechanism for communicating information, and one or more hardware processors 804 coupled to the bus 802 for processing information. Hardware processor(s) 804 may be, for example, one or more general purpose microprocessors. The processor(s) 804 may correspond to a processor described above in reference to computer system 105.

The computer system 800 also includes a main memory 806, such as a random access memory (RAM), cache and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions. In some embodiments, the instructions may cause the computer system 800 to obtain a geographic location of the device, obtain a boundary corresponding to a contiguous geographical boundary area around the geographic location of the device, load map data from the storage device 810 to the memory 806 of the device, the map data including a plurality of map data tiles, each of the plurality of map data tiles including a portion of the geographical boundary area in the geographical boundary area correspond to a portion of the loaded map data. The plurality of map data tiles loaded to the memory 806 includes a center tile having a point corresponding to geographic location of the device and map data tiles surrounding the center tile. The boundary is centered on the center tile and dimensions such that the geographical boundary area intersects the surrounding map data tiles. When the vehicle is in motion, the instructions may further cause the computer system 802 obtain an updated geographic location of the device, determine the position of the updated geographic location relative to the boundary area, and in response to determining the updated geographic location is outside of the boundary area obtain an updated boundary centered on the updated geographic location and load map data from the storage device 810 to the memory 806 based on the updated boundary such that the resulting loaded map data includes a center tile having a point corresponding to the updated geographic location of the device, and map data tiles surrounding the center tile that intersect the geographical boundary area.

The computer system 800 further includes a read only memory (ROM) 808 or other static storage device coupled to bus 802 for storing static information and instructions for processor 804. A storage device 810, such as a magnetic disk, optical disk, or USB thumb drive (Flash drive), etc., is provided and coupled to bus 802 for storing information and instructions. The main memory 806, the ROM 808, and/or the storage 810 may correspond to the memory 106 described above for storing map data. In some embodiments, the main memory 806 is the memory used to store the map data tiles when they are being used to control the vehicle 120. For example, one or more map data tiles may be initially stored on the storage device 810 and then, as needed based on the methods and systems described herein, the one or more map data tiles may be loaded into memory 806 and used to control the vehicle 120.

The computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor(s) 804 executing one or more sequences of one or more instructions contained in main memory 806. Such instructions may be read into main memory 806 from another storage medium, such as storage device 810. Execution of the sequences of instructions contained in main memory 806 causes processor(s) 804 to perform the process steps described herein. In alternative embodiments, hard-wired circuitry may be used in place of or in combination with software instructions.

The main memory 806, the ROM 808, and/or the storage 810 may include non-transitory storage media. The term "non-transitory media," and similar terms, as used herein refers to a media that store data and/or instructions that cause a machine to operate in a specific fashion, where the media excludes transitory signals. Such non-transitory media may comprise non-volatile media and/or volatile media. Non-volatile media includes, for example, optical or magnetic disks, such as storage device 810. Volatile media includes dynamic memory, such as main memory 806. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

The computer system 800 also includes a communication interface 818 coupled to bus 802. Communication interface 818 provides a two-way data communication coupling to one or more network links that are connected to one or more local networks. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN (or WAN component to communicated with a WAN). Wireless links may also be implemented. In any such implementation, communication interface 818 sends and receives electrical, electromagnetic or optical signals that carry digital data streams representing various types of information.

The computer system 800 can send messages and receive data, including program code, through the network(s) 825, network link 819 and communication interface 818. The networks(s) 825 maybe connected to one or more servers 830. In the Internet example, a server might transmit a requested code for an application program through the Internet, the ISP, the local network and the communication interface 818. The received code may be executed by processor 804 as it is received, and/or stored in storage device 810, or other non-volatile storage for later execution.

Figure 9:
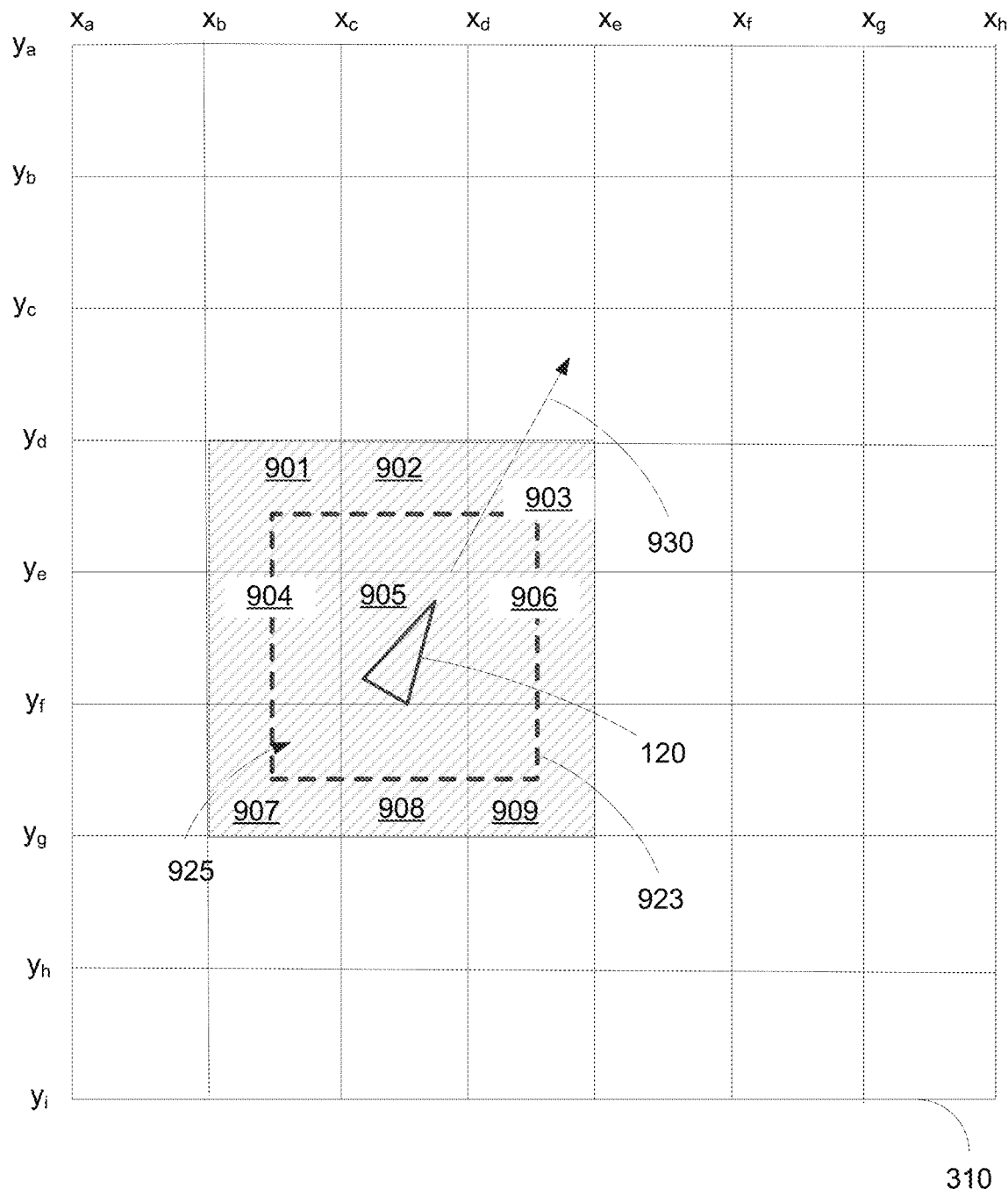
FIG. 9 is a schematic illustrating another example of map data that may be loaded into memory based on a vehicle's geographic location, the map data including a plurality of map data tiles where at least a portion of each of the plurality of map data tiles fall within a boundary defining a contiguous boundary area around the geographic location of the vehicle, and where a motion vector (e.g., a velocity vector indicating the speed and direction of the vehicle) has been obtained (e.g., determined by the system based on subsequent determination of the vehicle geographic location).

FIG. 9 is a schematic illustrating another example of map data that may be loaded into memory based on a vehicle's geographic location. In FIG. 9, the map data includes a plurality of map data tiles 901-909, where at least a portion of each of the plurality of map data tiles 901-909 fall within an initial boundary 923 defining a boundary area 925 around the vehicle 120. In FIG. 9, a motion vector 930 that indicates the speed and direction of the vehicle has been obtained (e.g., determined by the system based on subsequent determination of the vehicle geographic location). The example illustrated in FIG. 9 is similar to the example illustrated in FIG. 4, except that information relating to the speed and direction the vehicle has been obtained and therefore can be used to determine an updated boundary 922 (FIG. 10).

Figure 10:
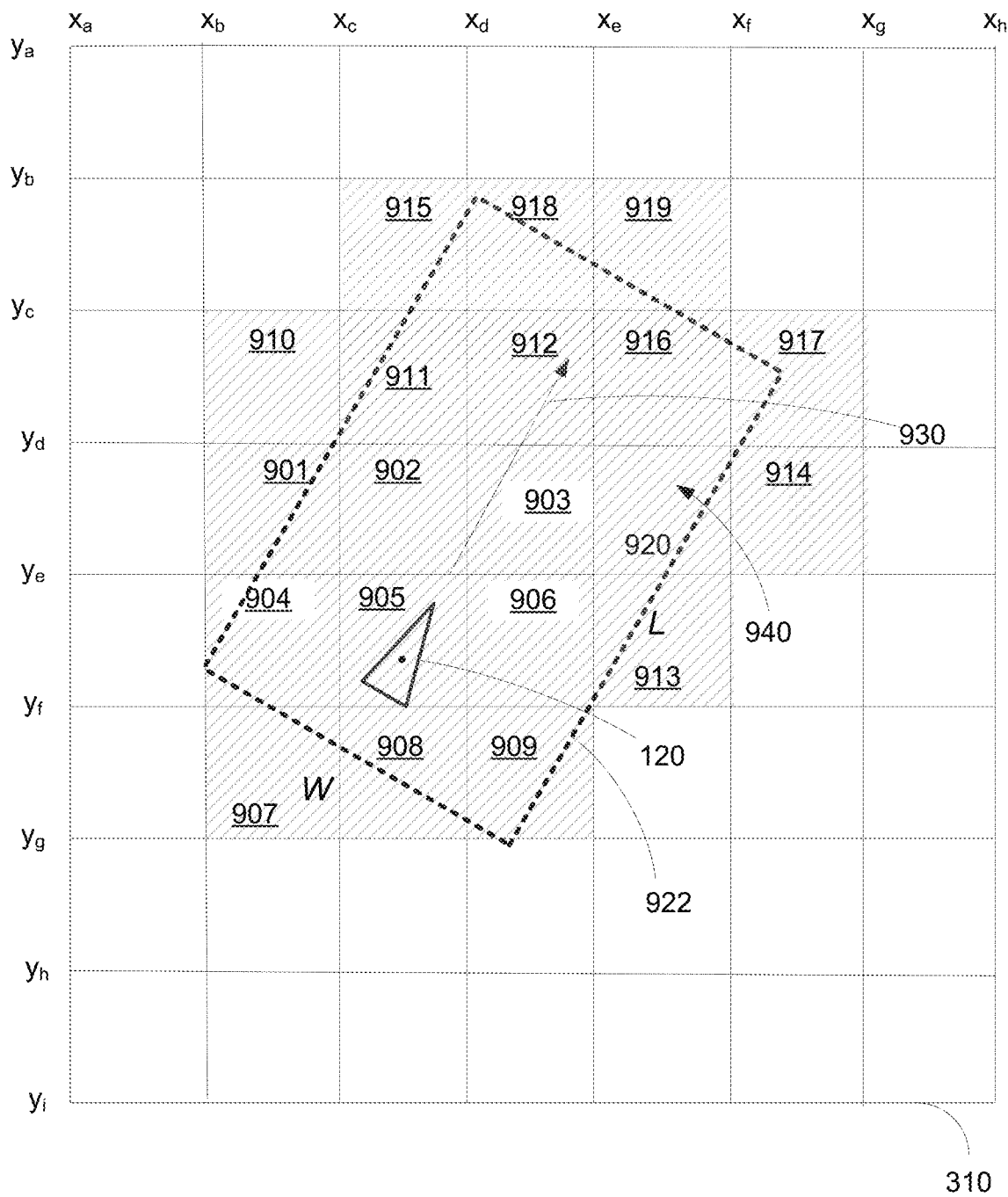
FIG. 10 is a schematic illustrating another example of map data that may be loaded into memory based on a vehicle's geographic location and the motion vector that determines a size or shape characteristic (e.g., a dimension) of a boundary that is used to determine which map data tiles to load into memory.

FIG. 10 is a schematic illustrating another example of map data that may be loaded into memory based on a vehicle's geographic location and the motion vector that determines a size or shape characteristic (e.g., a dimension) of a boundary that is used to determine which map data tiles to load into memory. In this embodiment, the speed of the vehicle 120 has been determined. Based on the speed of the vehicle, the system 105 may determine that a larger boundary 922 is necessary to ensure that the map data tile loaded in memory covers the area that the vehicle 120 will be moving through in the immediate future. In this case, due to the higher rate of speed as indicated by the motion vector 920, the larger boundary 922 is determined to extend a greater distance in the direction the vehicle is moving relative to the direction behind the vehicle or to the sides of the vehicle. In this embodiment, instead of loading nine map data tiles based on the updated boundary 922, twenty map data tiles 901-920 are loaded into memory. The boundary 922 defines a boundary area 940 that is larger than the boundary area 425 illustrated in FIG. 4. The map data tiles 901-920 each cover a portion of the boundary area 940, the map data tiles being either surrounded by or intersected by the boundary 922.

Figure 11:
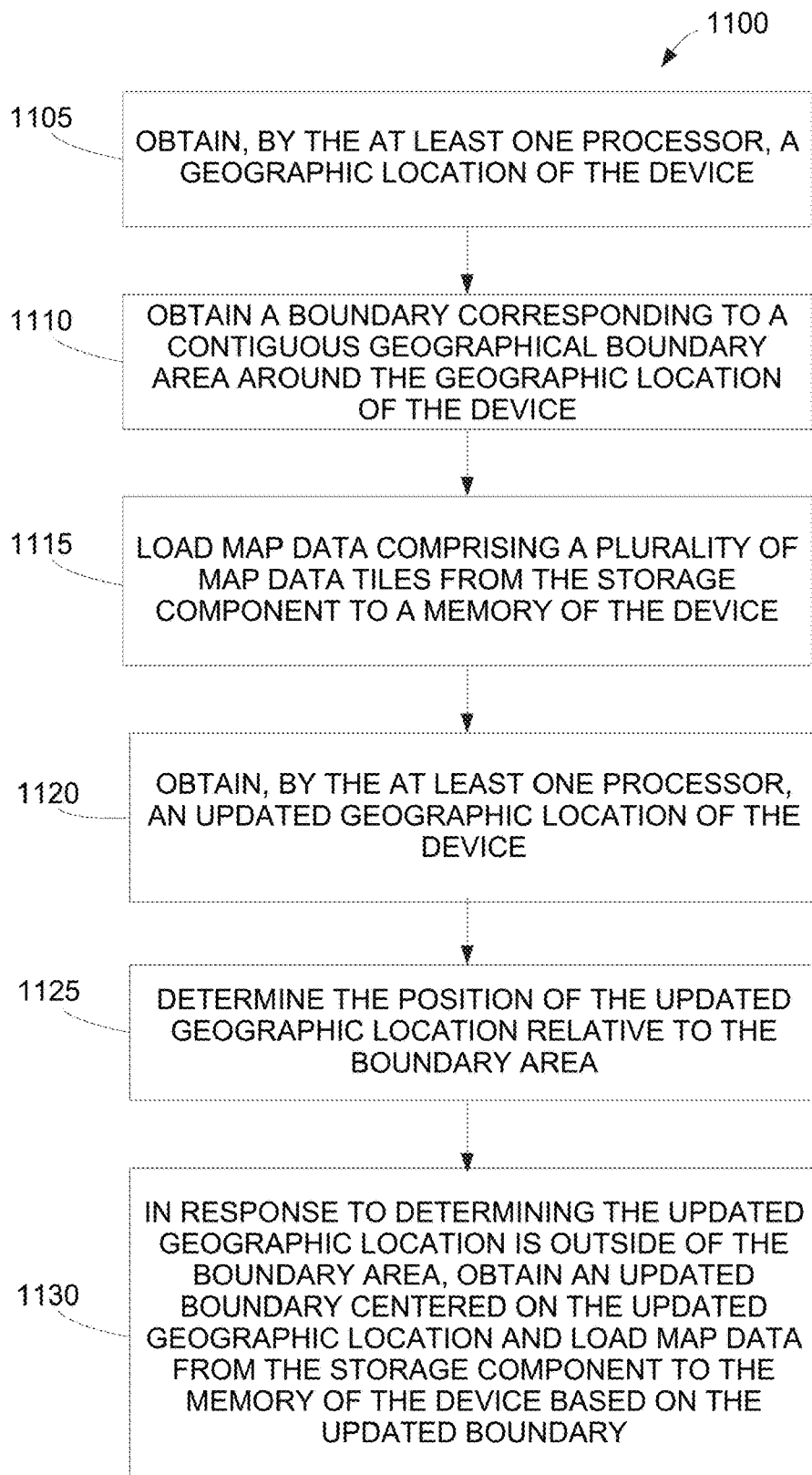
FIG. 11 is flow chart of a method of loading map data.

FIG. 11 is flow chart 1100 of a method of loading map data. The method may be implemented on a device of a movable vehicle, the device having at least one processor and a storage component coupled to the processor. At block 1105, the method includes obtaining, by the at least one processor, a geographic location of the device/vehicle. In various embodiments, the geographic location of the device can be obtained using one or more of the sensors described in reference to FIG. 2, or another suitable component. At block 1110, the method obtains a boundary corresponding to a geographical boundary area around the geographic location of the device. The geographical boundary area may be contiguous. In various embodiments, boundary may be of predetermined size and shape, or it may be determined dynamically, for example, based on the direction and speed of the vehicle 120.

At block 1115, the method loads map data comprising a plurality of map data tiles from a storage component to a memory of the device. For example, storage device 810 may store hundreds or thousands of map data tiles. When needed, a plurality of the stored map data tiles may be loaded into memory 806, the map data tiles loaded being based on the boundary and being based on which map data tiles are already in memory 806. The resulting plurality of map data tiles in memory includes a center tile having a point corresponding to the geographic location of the device and surrounding map data tiles, and wherein the boundary is centered on the center tile and dimensioned such that the geographical boundary area intersects the surrounding map data tiles.

At block 1120 of the method, while the vehicle is in motion, the at least one processor obtains an updated geographic location of the vehicle. Similar to block 1110, the updated geographic location of the vehicle may be obtained using one or more of the sensors described in reference to FIG. 2. At block 1125, the at least one processor may determine the position of the updated geographic location relative to the boundary (or the geographic boundary area). At block 1130, in response to determining the updated geographic location of the vehicle is outside of the boundary area, the method obtains an updated boundary centered on the updated geographic location and loads map data from the storage component to the memory of the device based on the updated boundary. The updated boundary corresponds to an updated geographic area centered on the updated geographic location. The map data is loaded from the storage component to the memory of the device such that the resulting loaded map data includes a center tile having a point corresponding to the updated geographic location of the device, and map data tiles surrounding the center tile that intersect the geographical boundary area. As the vehicle continues to move, blocks 1120, 1125 and 1130 may be repeated to provide map data in a geographic area surrounding the moving vehicle.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the invention should not be taken to imply that the terminology is being redefined herein to be restricted to including any specific characteristics of the features or aspects of the technology with which that terminology is associated.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

The various operations of example methods described herein may be performed, at least partially, by an algorithm. The algorithm may be comprised in program codes or instructions stored in a memory (e.g., a non-transitory computer-readable storage medium described above). Such algorithm may comprise a machine learning algorithm or model. In some embodiments, a machine learning algorithm or model may not explicitly program computers to perform a function, but can learn from training data to make a predictions model (a trained machine learning model) that performs the function.

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

As used herein, the term "or" may be construed in either an inclusive or exclusive sense. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Moreover, certain terminology has been used to describe embodiments of the present disclosure. For example, the terms "one embodiment," "an embodiment," and "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure. Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claim subject matter lie in less than all features of a single foregoing disclosed embodiment.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "module," "unit," "component," "device," or "system." Furthermore, aspects of the present disclosure may take the form of a computer program product embodied in one or more computer readable media having computer readable program code embodied thereon.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Headings are included herein for reference and to aid in locating various sections. These headings are not intended to limit the scope of the concepts described with respect thereto. Such concepts may have applicability throughout the entire specification.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the figures may be combined, interchanged or excluded from other embodiments.

The phrase "based on" does not mean "based only on," unless expressly specified otherwise. In other words, the phrase "based on" describes both "based only on" and "based at least on." Unless otherwise explicitly stated, articles such as "a" or "an" should generally be interpreted to include one or more described items. Accordingly, phrases such as "a device configured to" are intended to include one or more recited devices.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims. Applicant reserves the right to submit claims directed to combinations and sub-combinations of the disclosed inventions that are believed to be novel and non-obvious. Inventions embodied in other combinations and sub-combinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

What is claimed is:

1. A method implemented on a device on a vehicle, the device having at least one processor and a storage component coupled to the processor, the method comprising:
   obtaining, by the at least one processor, a geographic location of the device;
   obtaining a boundary corresponding to a contiguous geographical boundary area around the geographic location of the device;
   loading map data comprising a plurality of map data tiles from the storage component to a memory of the device, each of the plurality of map data tiles including a portion of the geographical boundary area, the geographical boundary area corresponding to a portion of the loaded map data, wherein the plurality of map data tiles includes a center map data tile having a point corresponding to the geographic location of the device and surrounding map data tiles, and wherein the boundary is centered on the center map data tile and dimensioned such that the geographical boundary area passes through each of the surrounding map data tiles and surrounds the geographic location of the device;
   while the vehicle is in motion:
      obtaining, by the at least one processor, an updated geographic location of the device,
      determining the position of the updated geographic location relative to the geographical boundary area; and
   in response to determining that the updated geographic location is outside of the geographical boundary area that passes through each of the surrounding map data tiles,
      obtaining an updated boundary corresponding to an updated geographic boundary area centered on the updated geographic location, and
      loading additional map data comprising a new surrounding map data tile from the storage component to the memory of the device such that the resulting loaded map data and additional map data includes:
         a first surrounding map data tile of the surrounding map data tiles having a point corresponding to the updated geographic location of the device, and
         the center map data tile, other map data tiles of the surrounding map data tiles, and the new surrounding map data tile that surround the first surrounding map data tile and through which the updated geographical boundary area passes.

2. The method of claim 1, wherein the surrounding map data tiles are adjacent to the center map data tile.

3. The method of claim 1, wherein the plurality of map data tiles comprises elevation information.

4. The method of claim 1, wherein the plurality of map data tiles comprises intensity information.

5. The method of claim 1, wherein the geographical boundary area corresponds to an area that includes the center map data tile and at least a portion of the plurality of map data tiles adjacent to the center map data tile.

6. The method of claim 1, wherein the boundary is rectangular-shaped.

7. The method of claim 6,
wherein each map data tile of the plurality of map data tiles comprises a width dimension and a length dimension, and the boundary comprises a boundary width dimension and a boundary length dimension, and
wherein the boundary width dimension is between one and three times the width dimension of each map data tile of the plurality of map data tiles, and the boundary length dimension is between one and three times the length dimension of each map data tile of the plurality of map data tiles.

8. The method of claim 1, wherein the loaded map data comprises nine map data tiles.

9. The method of claim 8, wherein each of the nine map data tiles has equal dimensions.

10. The method of claim 8, wherein the nine map data tiles comprise the center map data tile and eight surrounding map data tiles.

11. The method of claim 1, wherein the plurality of map data tiles comprises a center map data tile and more than eight surrounding map data tiles.

12. The method of claim 1, wherein the vehicle is an autonomous vehicle.

13. The method of claim 1, wherein the boundary is non-rectangular.

14. The method of claim 1, wherein a size of the boundary and a size of the updated boundary are pre-determined.

15. The method of claim 1, wherein obtaining the updated boundary comprises dynamically determining the updated boundary.

16. The method of claim 15, wherein dynamically determining the updated boundary comprises obtaining a velocity of the moving vehicle and determining a dimension of the boundary based on the velocity.

17. The method of claim 15, wherein dynamically determining the updated boundary comprises obtaining a velocity of the moving vehicle and determining a shape of the boundary based on the velocity.

18. The method of claim 1, further comprising determining a motion direction representing the direction the vehicle is moving, wherein the boundary extends farther from the updated geographical location of the device in the direction of the motion direction than the boundary extends in other directions.

19. The method of claim 1, wherein the storage device comprises an optical or magnetic hard drive.

20. The method of claim 1, wherein each map data tile of the plurality of map data tiles is representative of an area that has a width dimension of less than 1000 meters and a length dimension of less than 1000 meters.

21. The method of claim 1, wherein each map data tile of the plurality of map data tiles is representative of an area that has a width dimension of less than 500 meters and a length dimension of less than 500 meters.

22. The method of claim 1, wherein each map data tile of the plurality of map data tiles is representative of an area that has a width dimension of less than 250 meters and a length dimension of less than 250 meters.

23. The method of claim 1, wherein each map data tile of the plurality of map data tiles is representative of an area that has a width dimension of about 200 meters and a length dimension of about 200 meters.

24. The method of claim 1, wherein each map data tile of the plurality of map data tiles is representative of an area that has a width dimension of less than 100 meters and a length dimension of less than 100 meters.

25. The method of claim 1, wherein the boundary is dimensioned such that in response to determining that the updated geographic location is outside of the geographical boundary area, loading additional map data comprises loading the new surrounding map data tile and two other new surrounding map data tiles.

26. The method of claim 1, wherein the boundary is dimensioned such that in response to determining that the updated geographic location is outside of the geographical boundary area, loading additional map data comprises loading the new surrounding map data tile and four other new surrounding map data tiles.

27. The method of claim 1, wherein obtaining a geographic location of the device comprises receiving, by the at least one processor, information from a global positioning system (GPS).

28. The method of claim 1, wherein obtaining a geographic location of the device comprises receiving geographic location information from at least one transmitter at a fixed location.

29. The method of claim 1, wherein obtaining a geographical location of the device comprises sensing at least one fixed location indicator using a sensing system on the vehicle, and determining a geographical location based on the sensed at least one fixed location indicator.

30. A system, comprising:
a storage system configured to store map data comprising a plurality of map data tiles;
at least one processor coupled to a memory component including a set of instructions and to the storage system, when executing the set of instructions, the at least one processor is configured to cause the system to:
obtain a geographic location of the system;
obtain a boundary corresponding to a contiguous geographical boundary area around the geographic location of the system;
load map data from the storage component to the memory component of the system, the map data comprising a plurality of map data tiles, each of the plurality of map data tiles including a portion of the geographical boundary area and the geographical boundary area corresponding to a portion of the loaded map data, wherein the plurality of map data tiles includes a center map data tile having a point corresponding to the geographic location of the system and surrounding map data tiles, and wherein the boundary is centered on the center map data tile and dimensioned such that the geographical boundary area passes through each of the surrounding map data tiles and surrounds the geographic location of the system;
while the system is in motion:
obtain an updated geographic location of the system, determine the position of the updated geographic location relative to the geographical boundary area; and in response to determining that the updated geographic location is outside of the geographical boundary area that passes through each of the surrounding map data tiles, obtain an updated boundary centered on the updated geographic location, and load additional map data comprising a new surrounding map data tile from the storage component to the memory component of the system based on the updated boundary.

31. The system of claim 30, further comprising a vehicle.

32. A non-transitory computer readable medium storing instructions, the instructions, when executed by a computing device on a vehicle, causing the computing device to:

obtain a geographic location of the computing device;

obtain a boundary corresponding to a contiguous geographical boundary area around the geographic location of the computing device;

load map data from the storage component to a memory of the computing device, the map data comprising a plurality of map data tiles, each of the plurality of map data tiles including a portion of the geographical boundary area and the geographical boundary area corresponding to a portion of the loaded map data, wherein the plurality of map data tiles includes a center map data tile having a point corresponding to the geographic location of the computing device and surrounding map data tiles, and wherein the boundary is centered on the center map data tile and dimensioned such that the geographical boundary area passes through each of the surrounding map data tiles and surrounds the geographic location of the computing device;

while the vehicle is in motion:

obtain an updated geographic location of the computing device, determine the position of the updated geographic location relative to the geographical boundary area; and in response to determining that the updated geographic location is outside of the geographical boundary area, obtain an updated boundary centered on the updated geographic location, and load additional map data comprising a new surrounding map data tile from the storage component to the memory of the computing device based on the updated boundary.

* * * * *